United States Patent [19]

Creed et al.

[11] Patent Number: 4,646,629

[45] Date of Patent: Mar. 3, 1987

[54] STERILIZING APPARATUS

[75] Inventors: Sherman H. Creed, Fresno; Wesley G. Thompson, Madera; Adil A. Mughannam, Fresno; Robert G. Beverly, Los Gatos, all of Calif.

[73] Assignee: FMC Corporation, Chicago, Ill.

[21] Appl. No.: 579,047

[22] Filed: Feb. 10, 1984

[51] Int. Cl.$^4$ ............................................. A23L 1/00
[52] U.S. Cl. ..................................... 99/468; 99/361; 99/470; 99/474; 99/477; 99/483; 104/48; 104/167; 414/240; 422/304
[58] Field of Search ................. 99/330, 483, 354–360, 99/361–371, 403–404, 409, 516, 443 C, 534, 536, 477, 478, 467–470, 474–476; 414/257, 240; 426/232, 523, 407, 412; 422/25, 302, 297, 304; 104/48, 167; 198/465.1, 465.2

[56] References Cited

U.S. PATENT DOCUMENTS

| | | | |
|---|---|---|---|
| 2,837,223 | 6/1958 | Wolff | 104/167 |
| 3,811,385 | 5/1974 | Johnson et al. | 104/167 |
| 3,927,976 | 12/1975 | Reimers et al. | 422/296 |
| 4,033,302 | 1/1977 | Mencacci | 99/359 |
| 4,085,668 | 4/1978 | Mughannam | 99/359 X |
| 4,092,111 | 5/1978 | Gaignoux et al. | 99/359 X |
| 4,164,590 | 8/1979 | Mencacci | 99/359 X |
| 4,169,408 | 10/1979 | Mencacci | 99/355 |
| 4,179,986 | 12/1979 | Mencacci | 99/359 |
| 4,385,035 | 5/1983 | Akitoshi et al. | 99/483 X |

Primary Examiner—Timothy F. Simone
Attorney, Agent, or Firm—L. J. Pizzanelli; A. J. Moore; R. B. Megley

[57] ABSTRACT

The disclosed sterilizing apparatus makes use of mobile cars containing a quantity of packages. The cars are continuously intermittently advanced to a package loading position, to an inlet lock where pressurizing and preheating of the car and its contents occur, to a sterilizing chamber for a sufficient period of time to effect sterilization, to a discharge lock that depressurizes and partially cools the car and its contents, to an atmospheric cooling station, to a water discharge station and then to a package unloading station.

21 Claims, 45 Drawing Figures

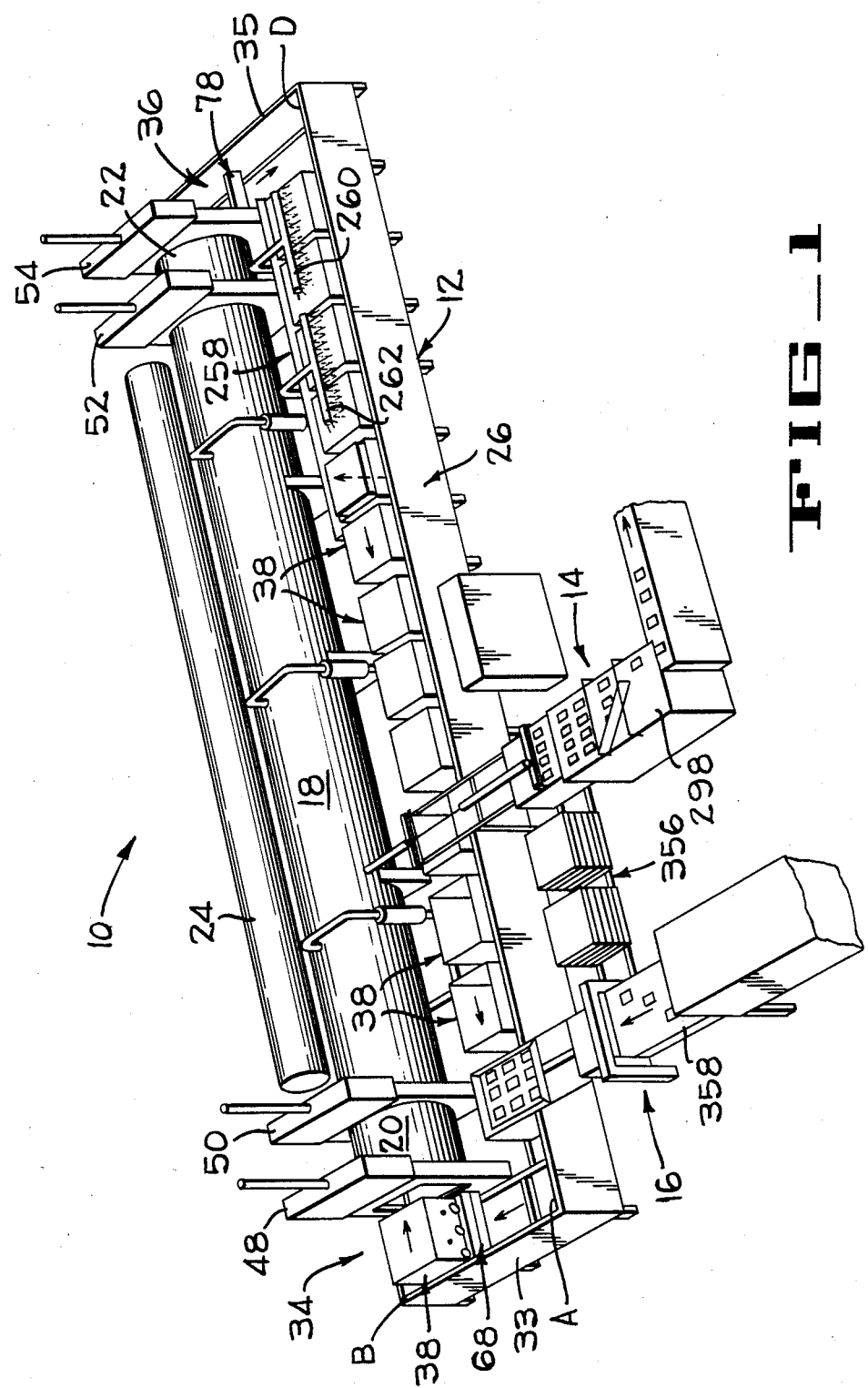

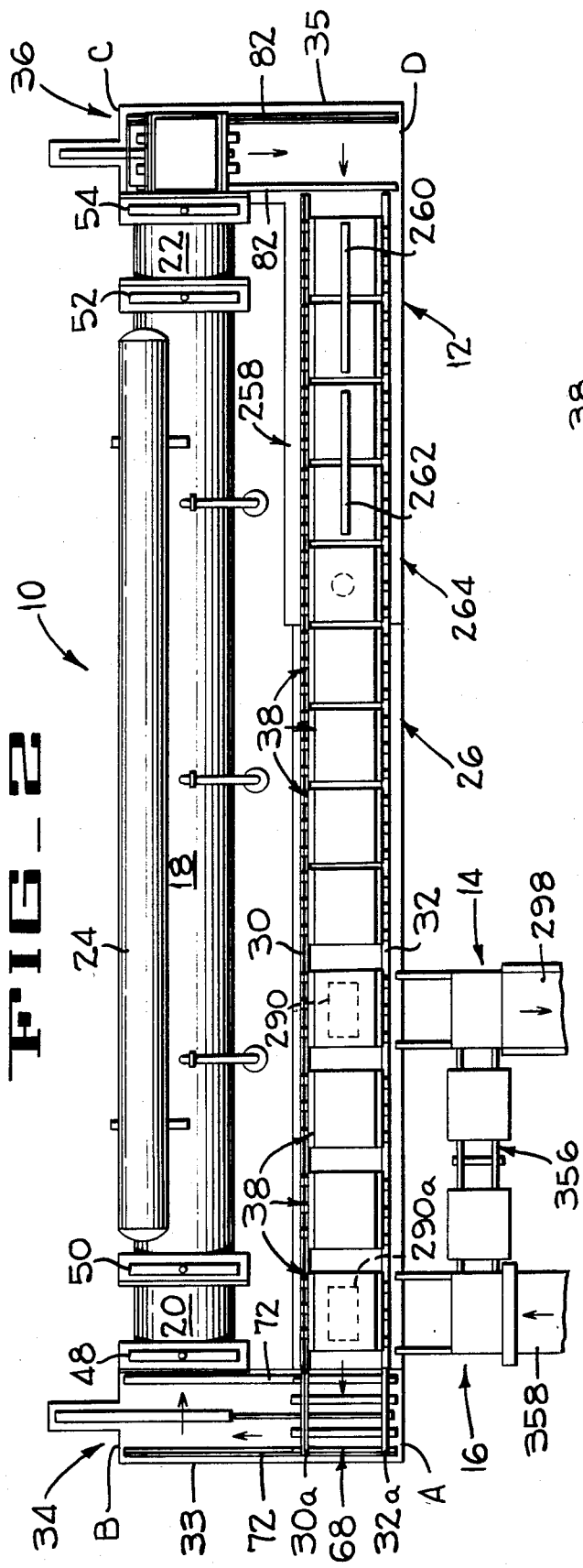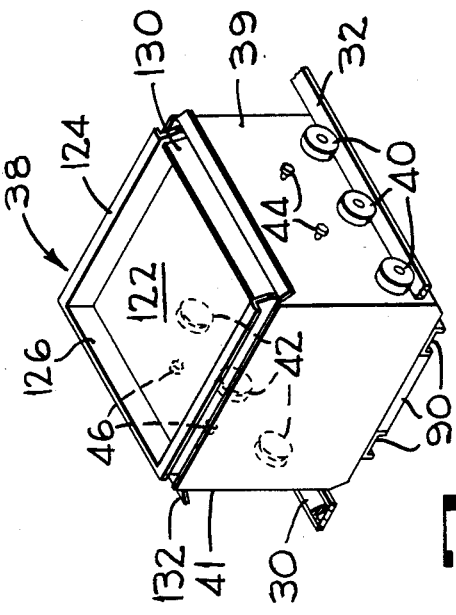

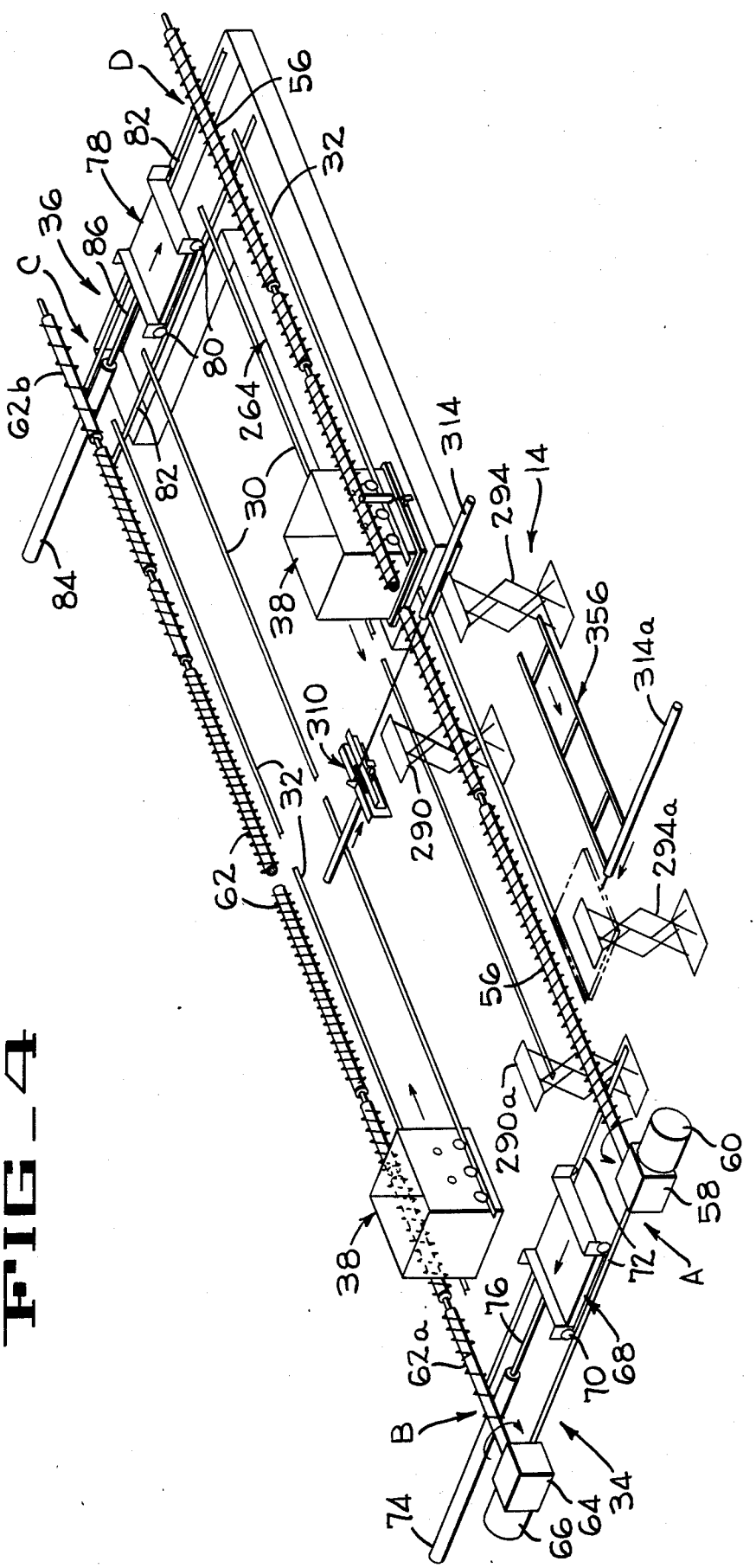

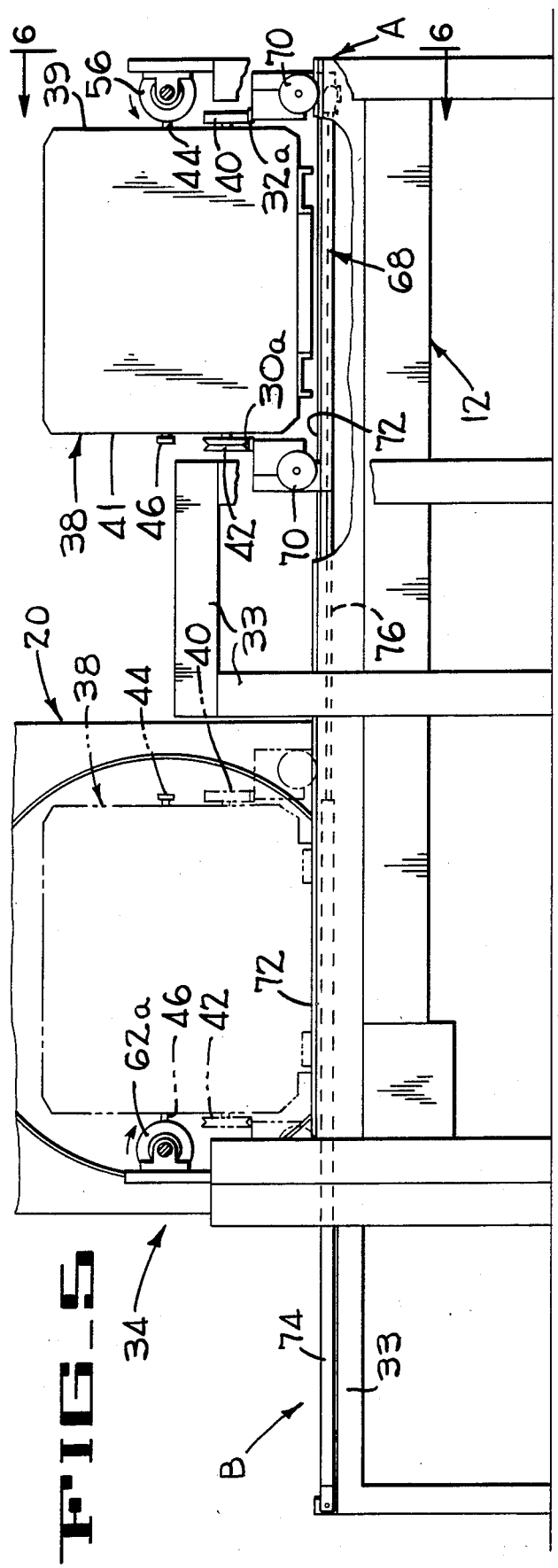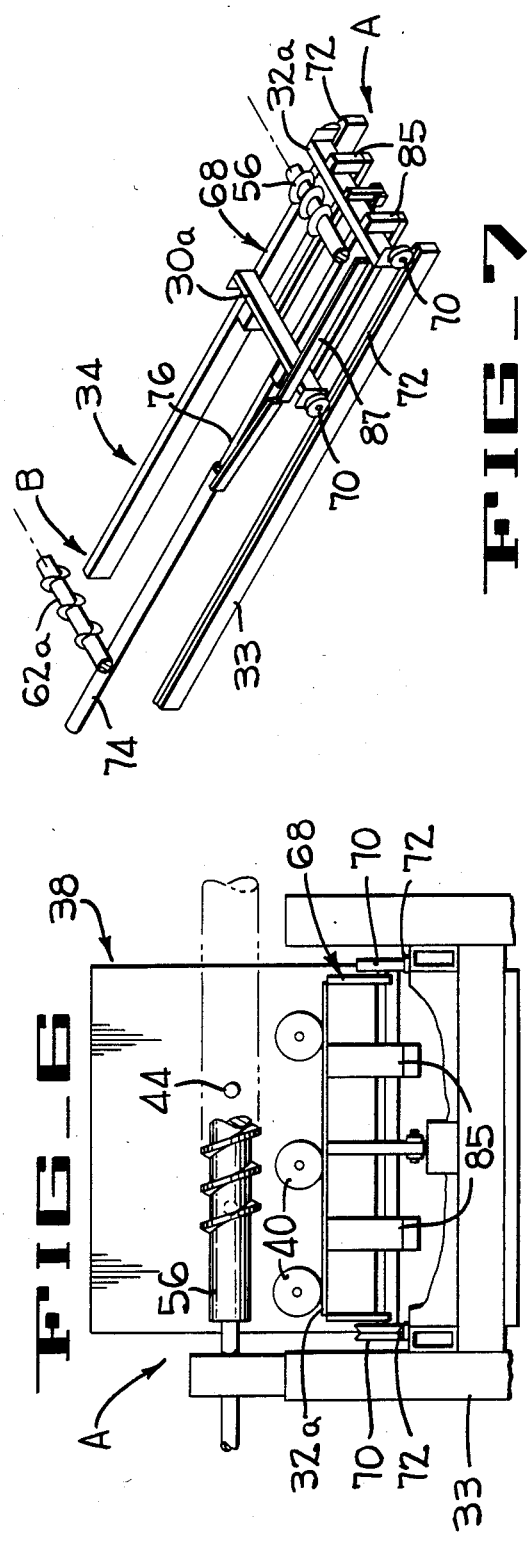

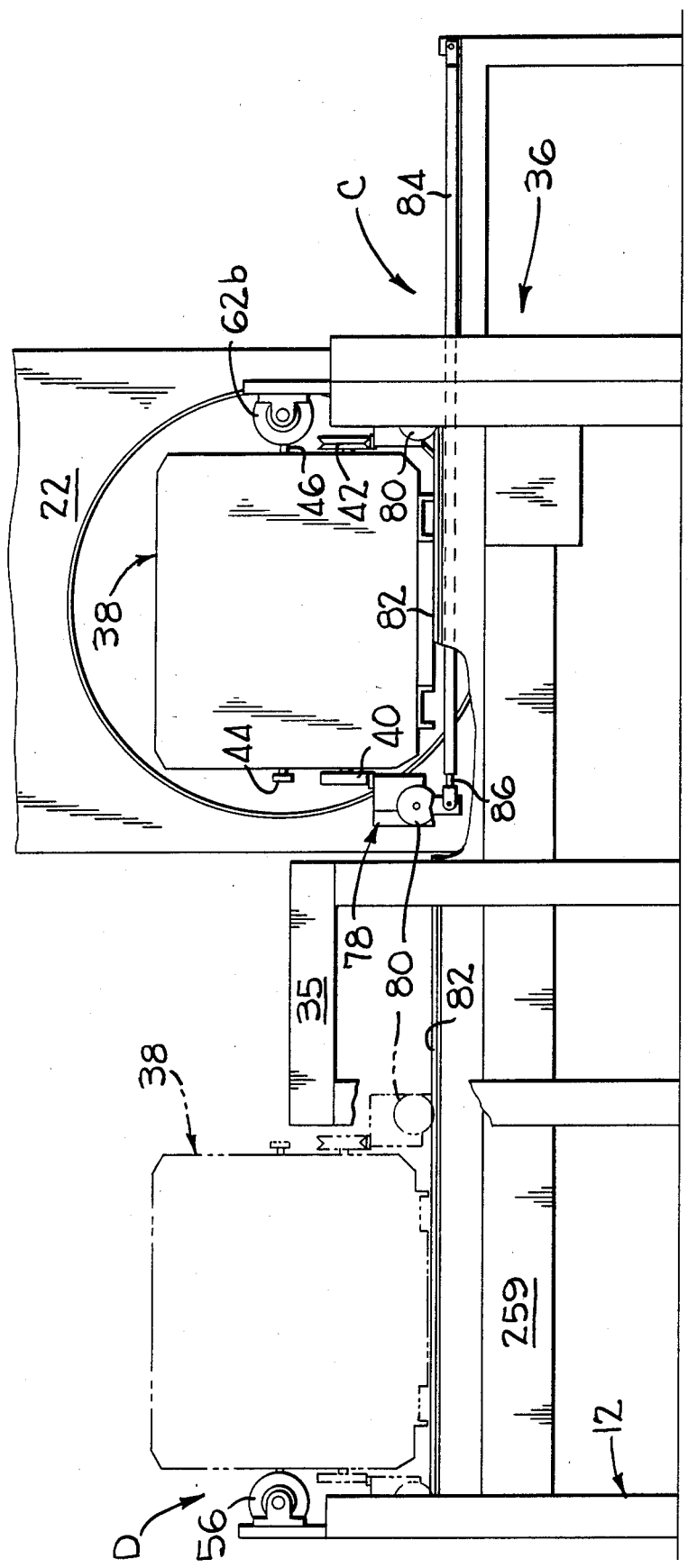
FIG_8

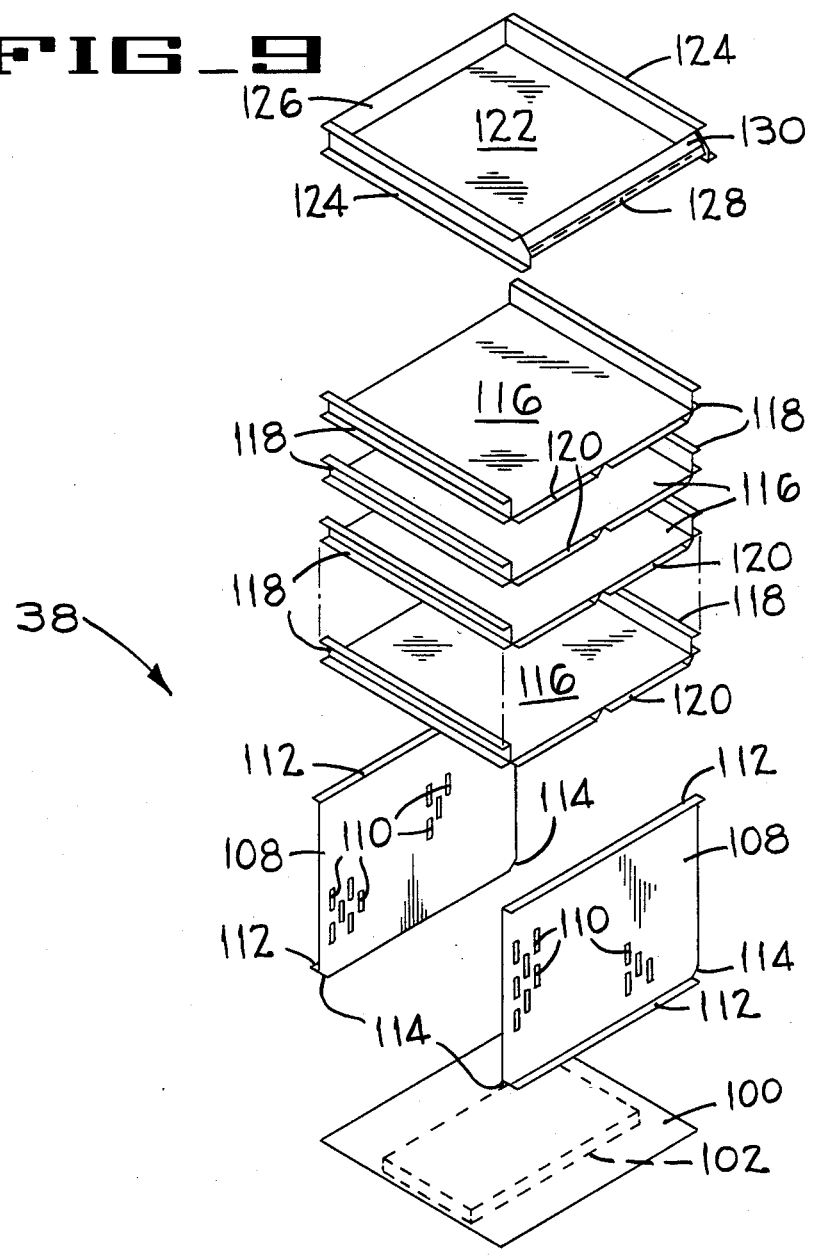
FIG_9

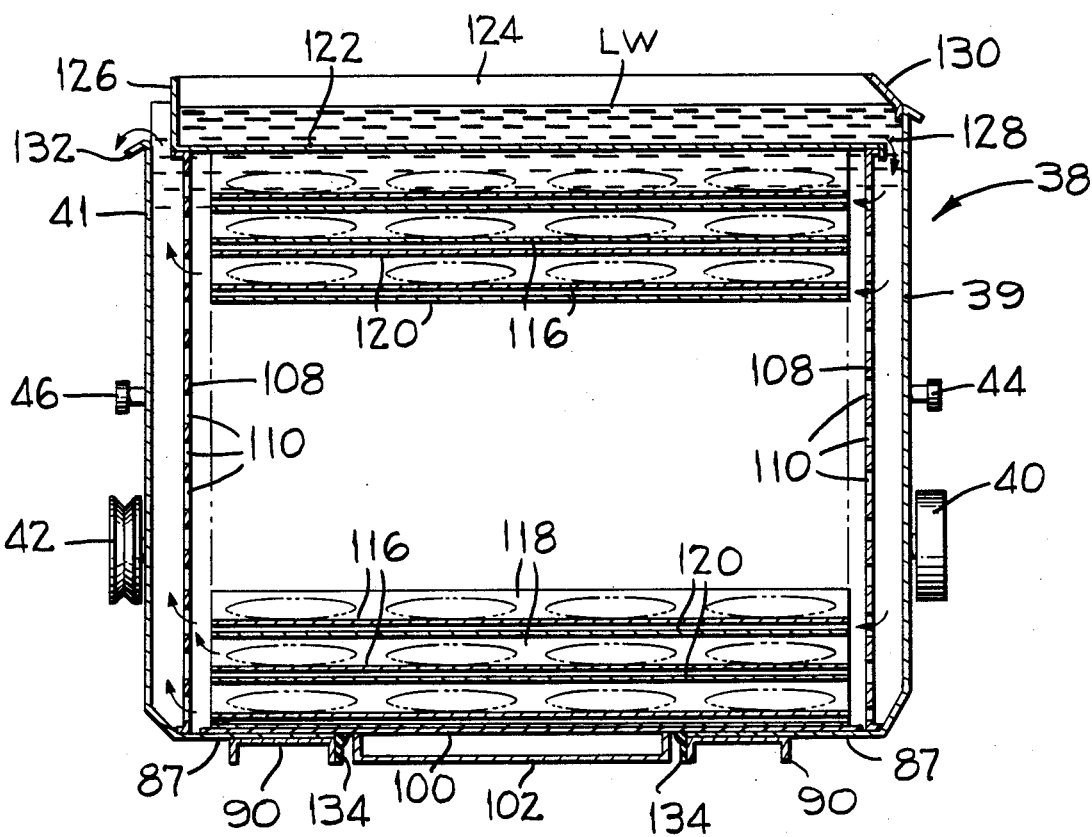
FIG_10
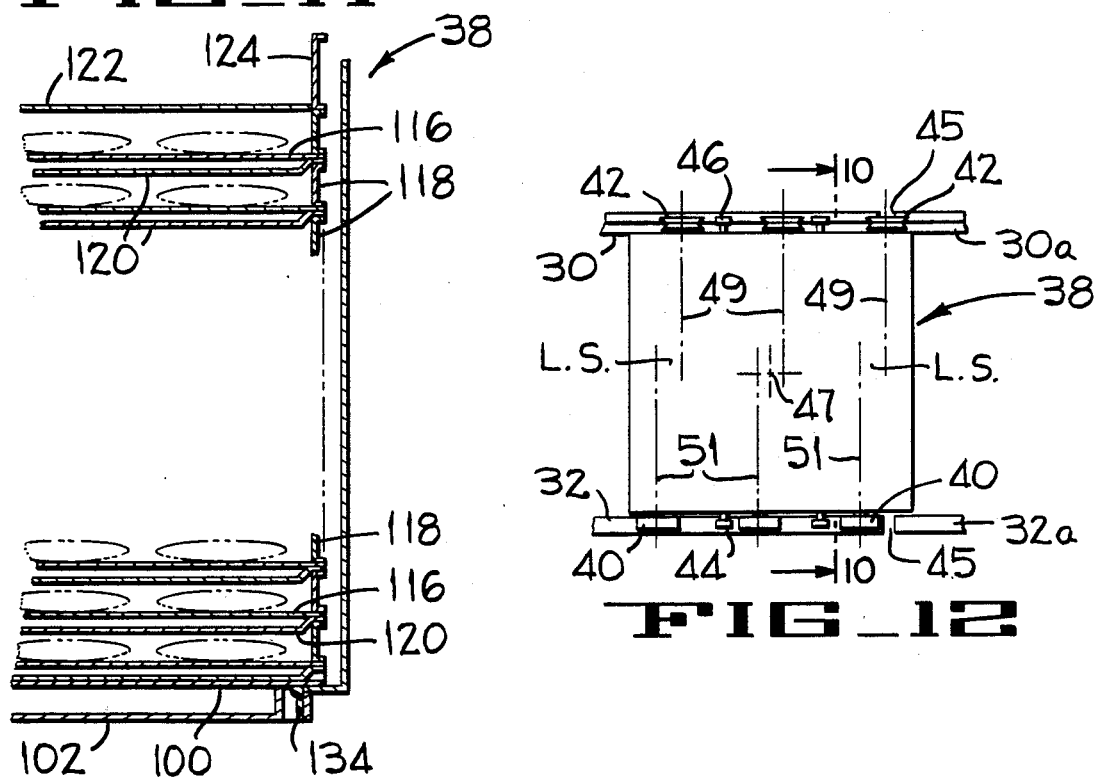
FIG_11
FIG_12

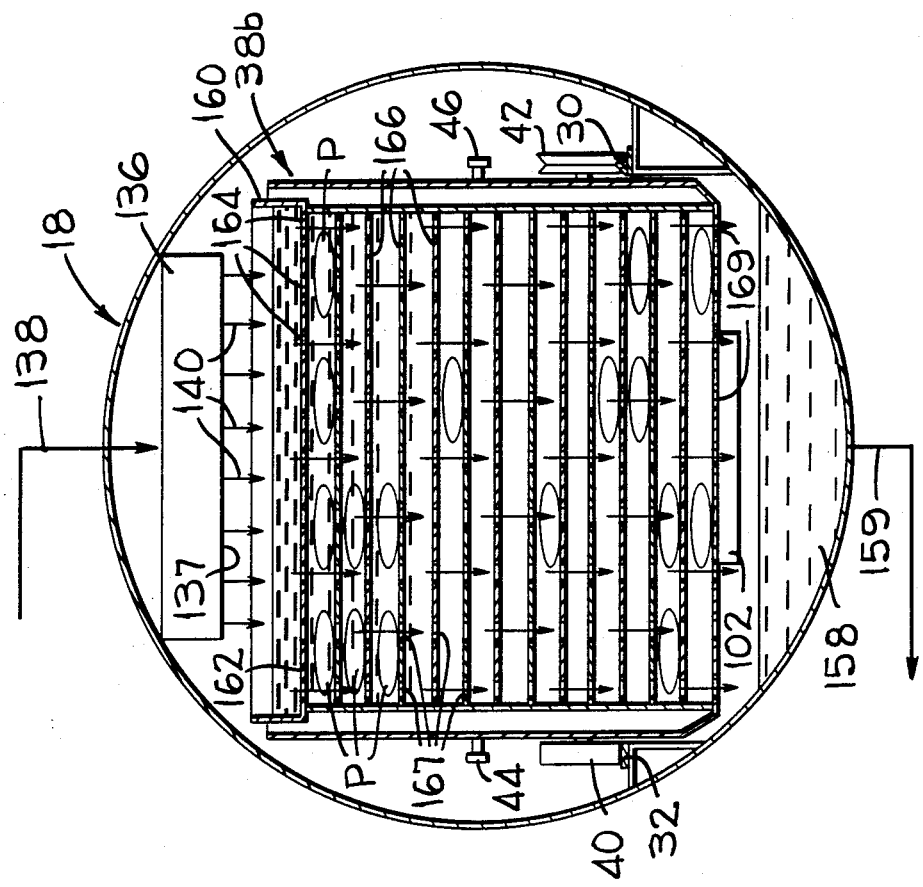
FIG_14
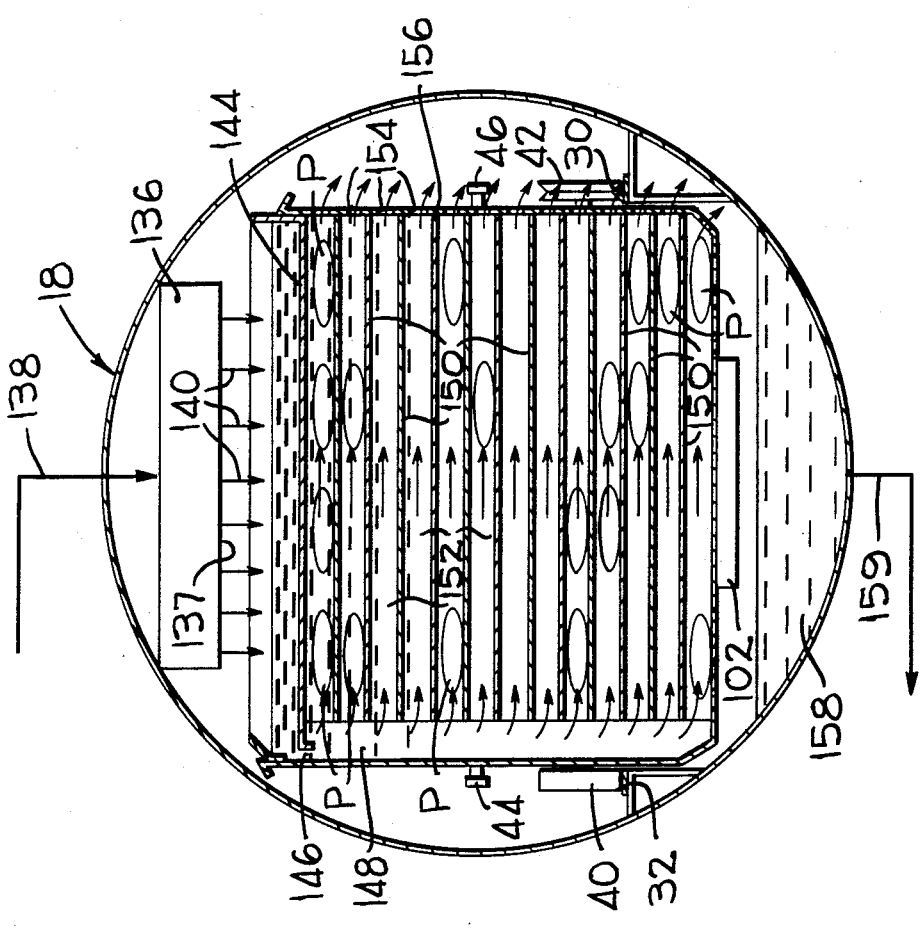
FIG_13

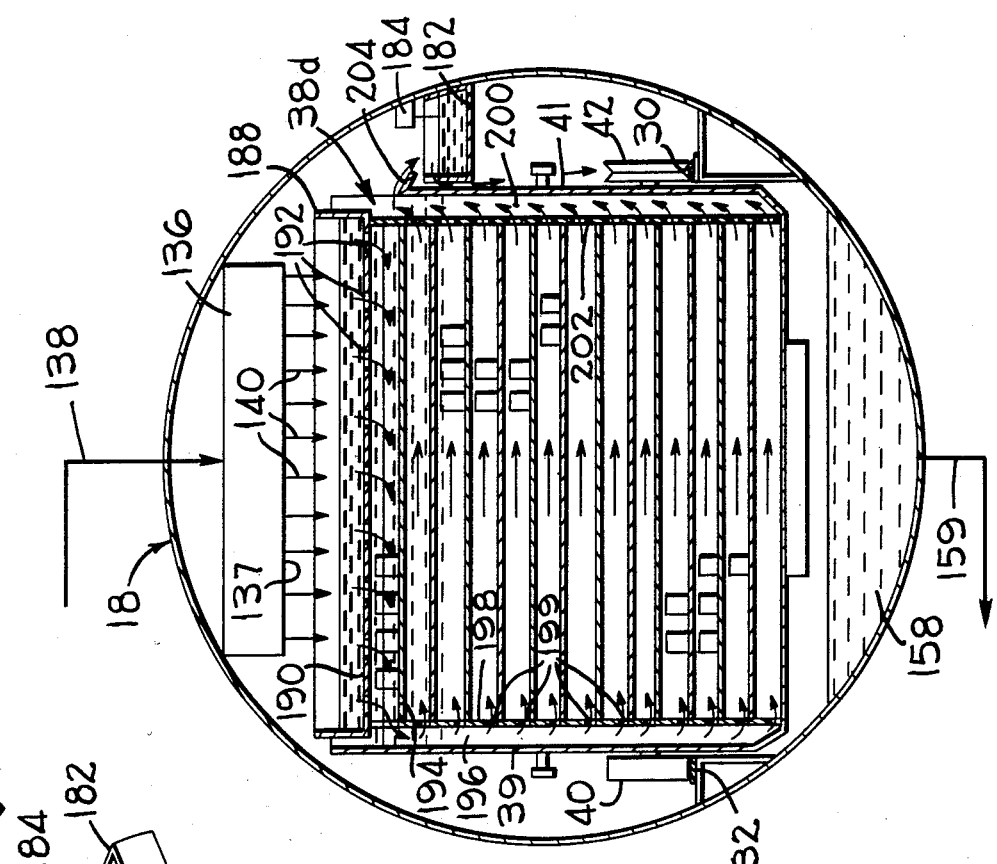
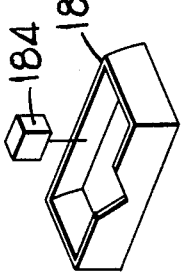
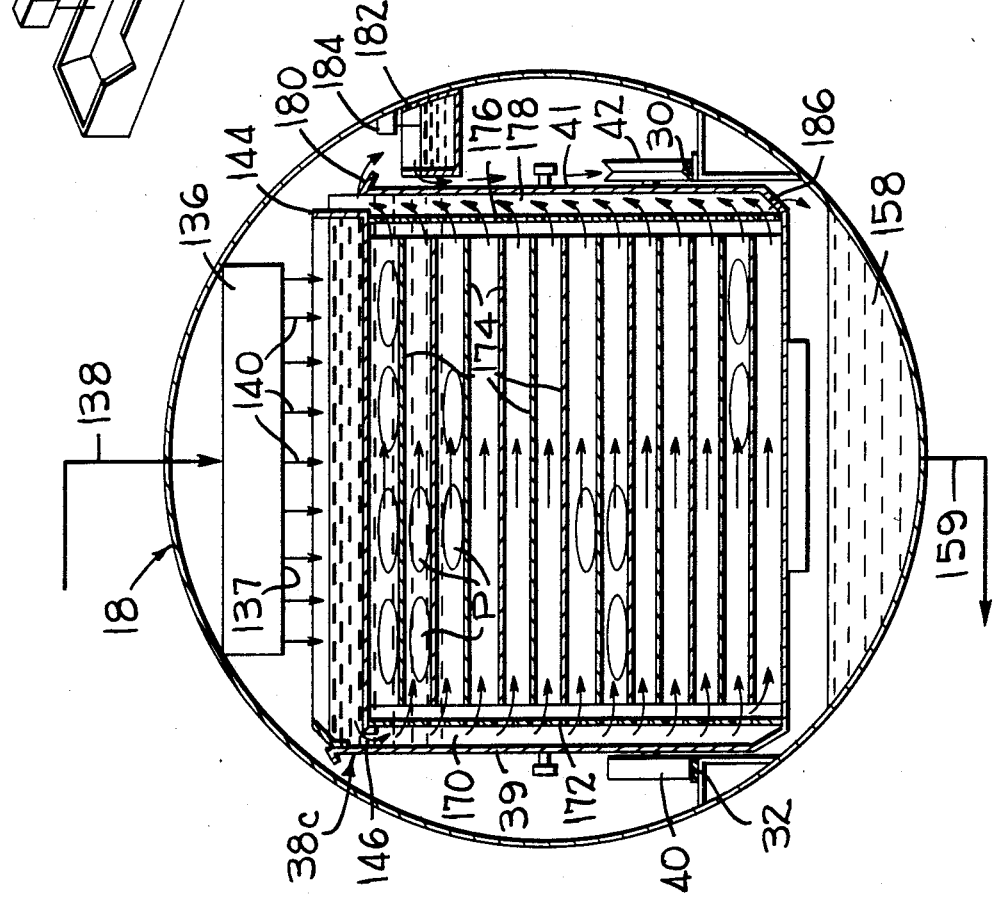

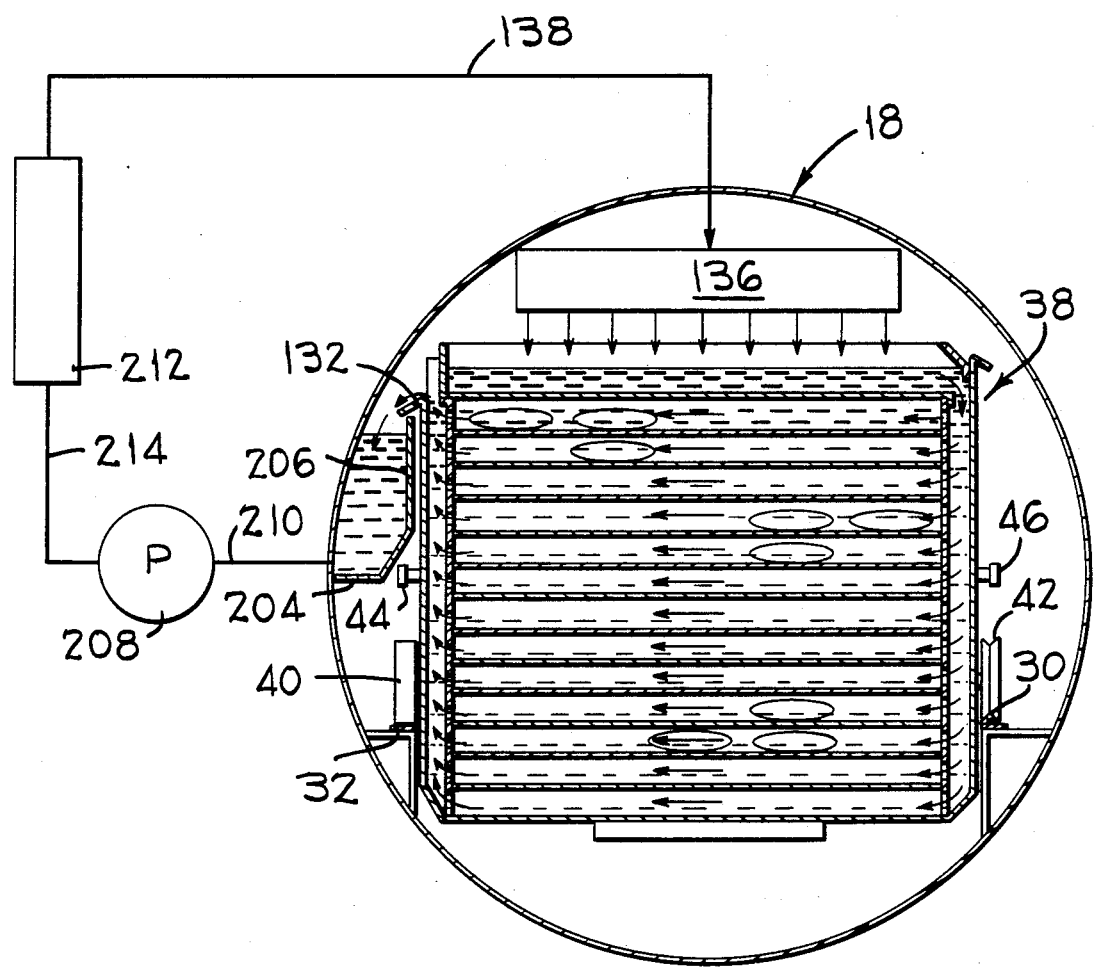
FIG_18

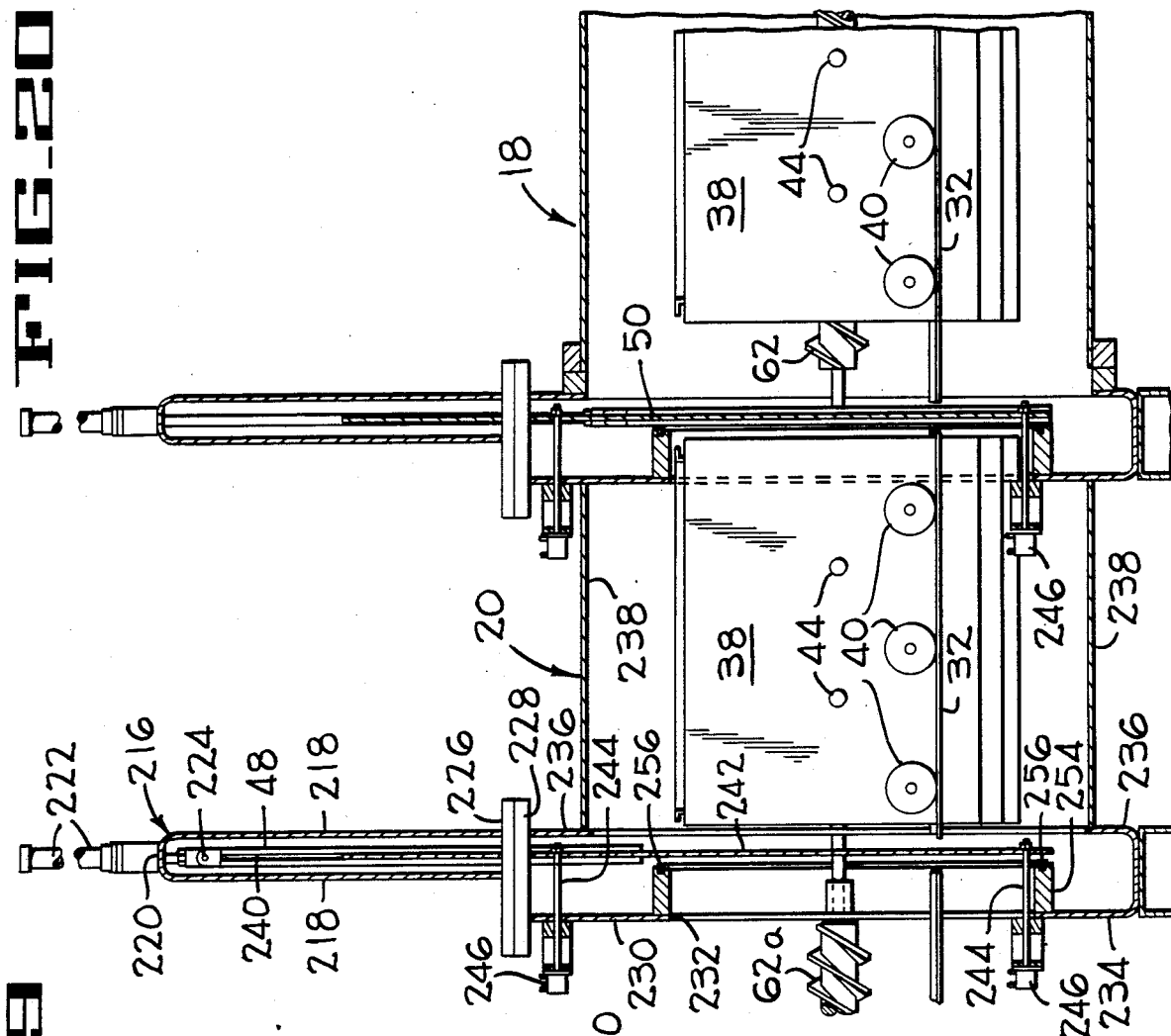
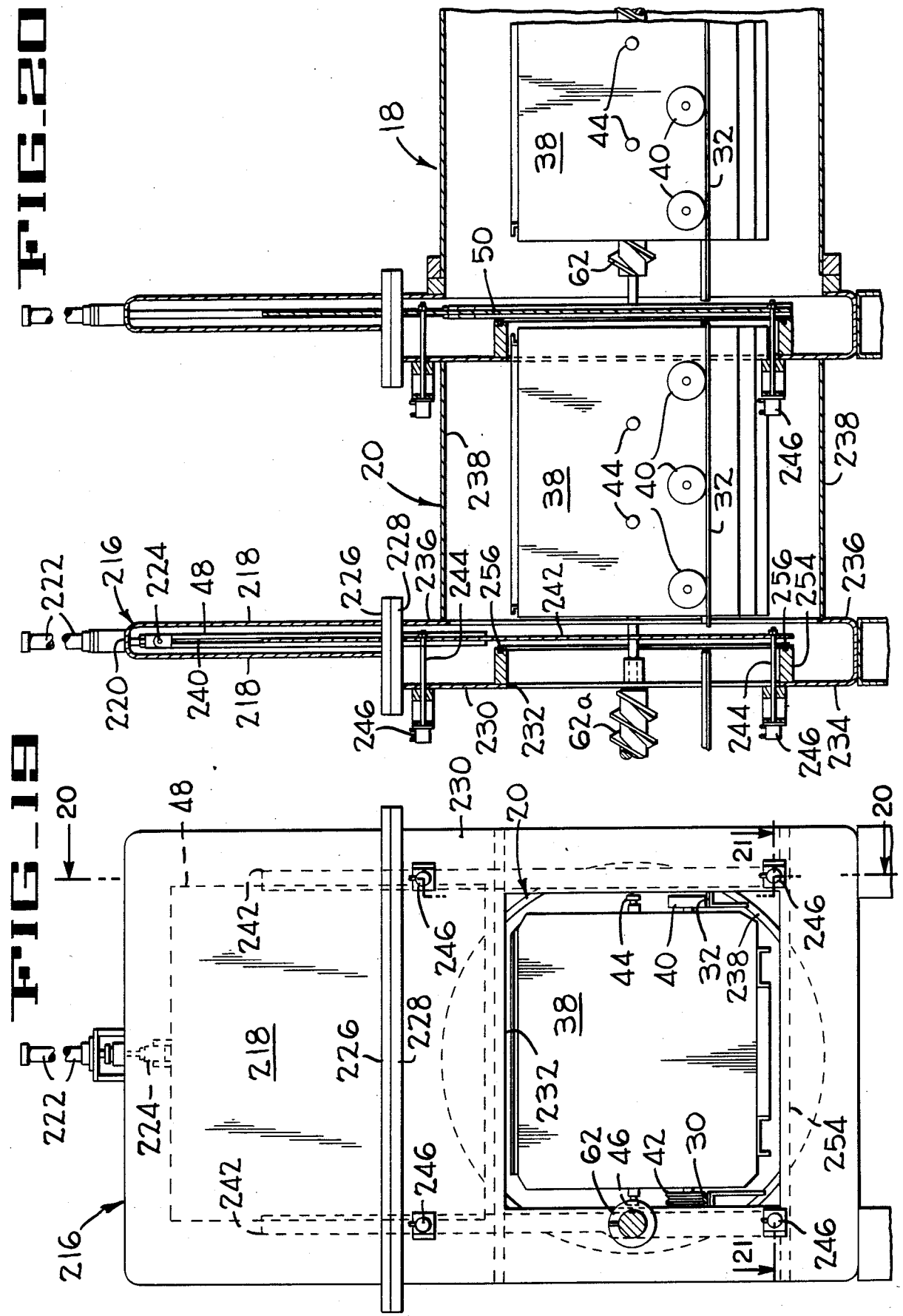

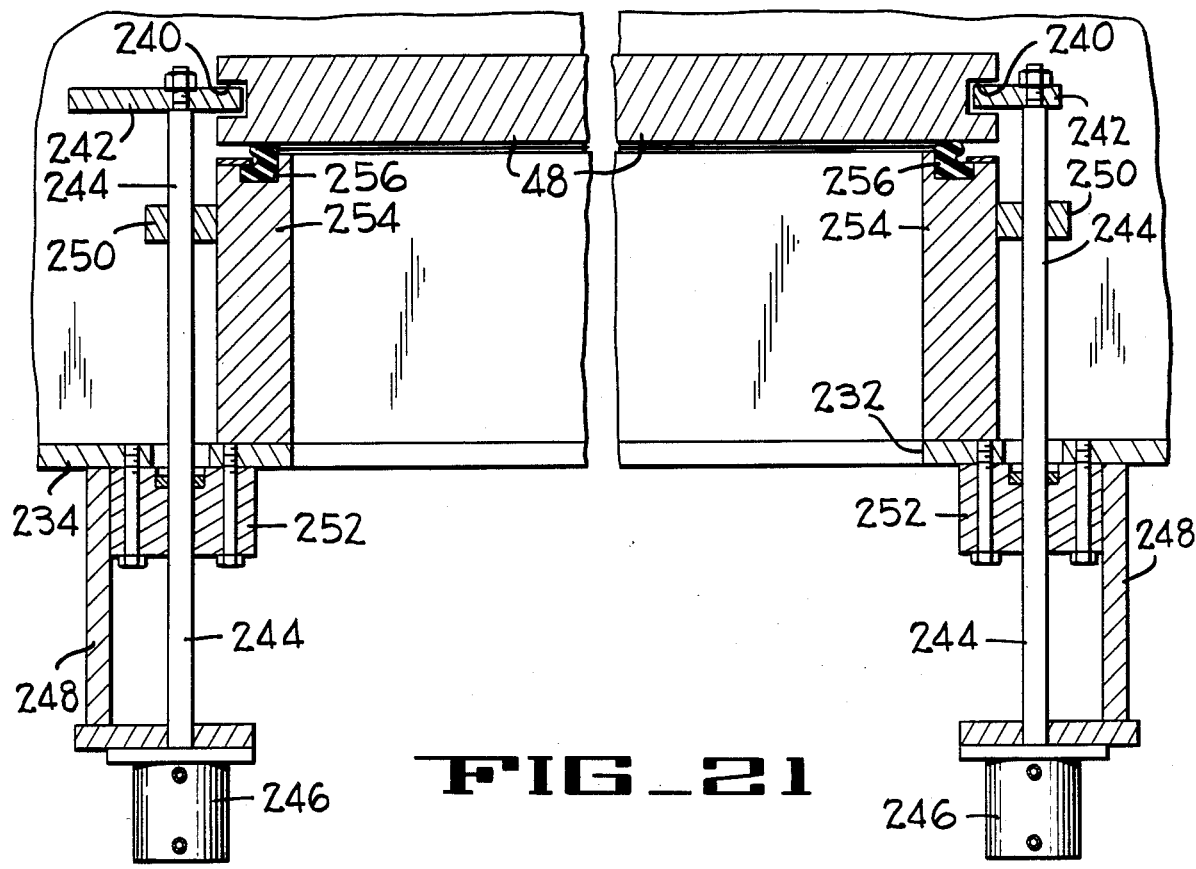
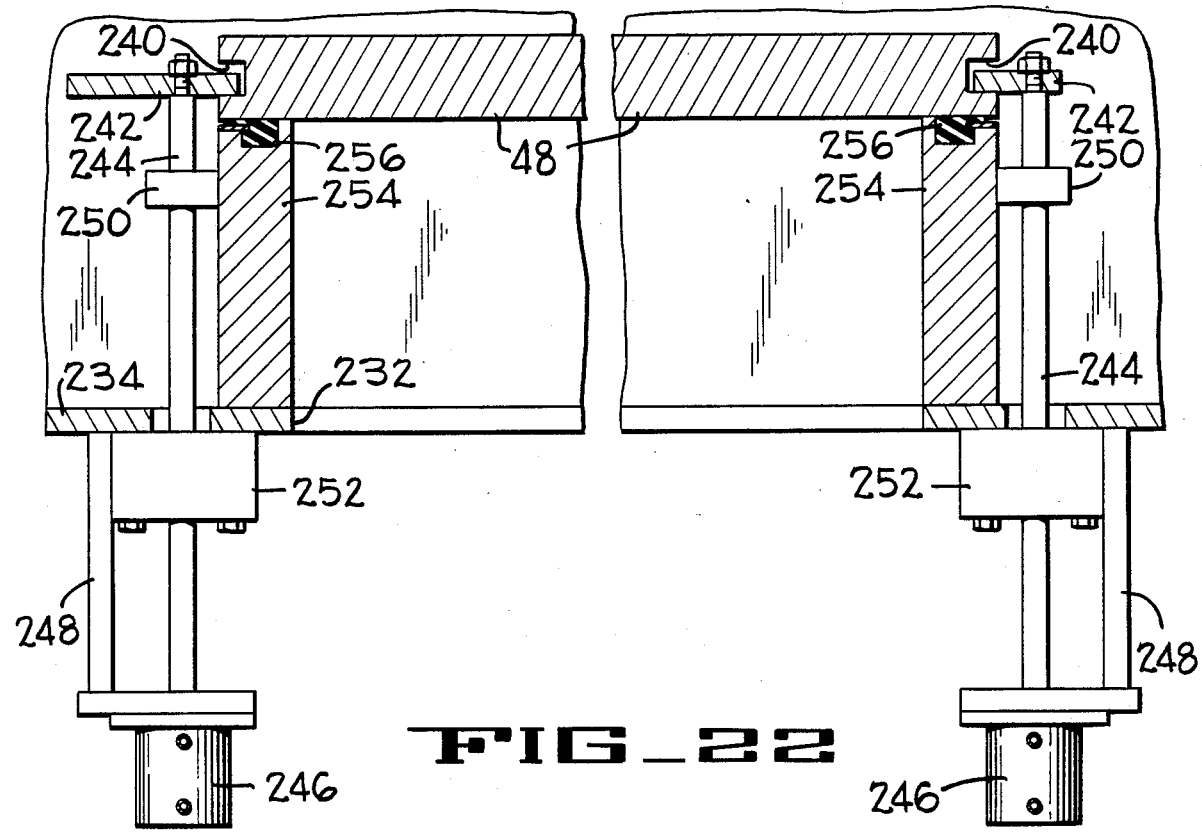

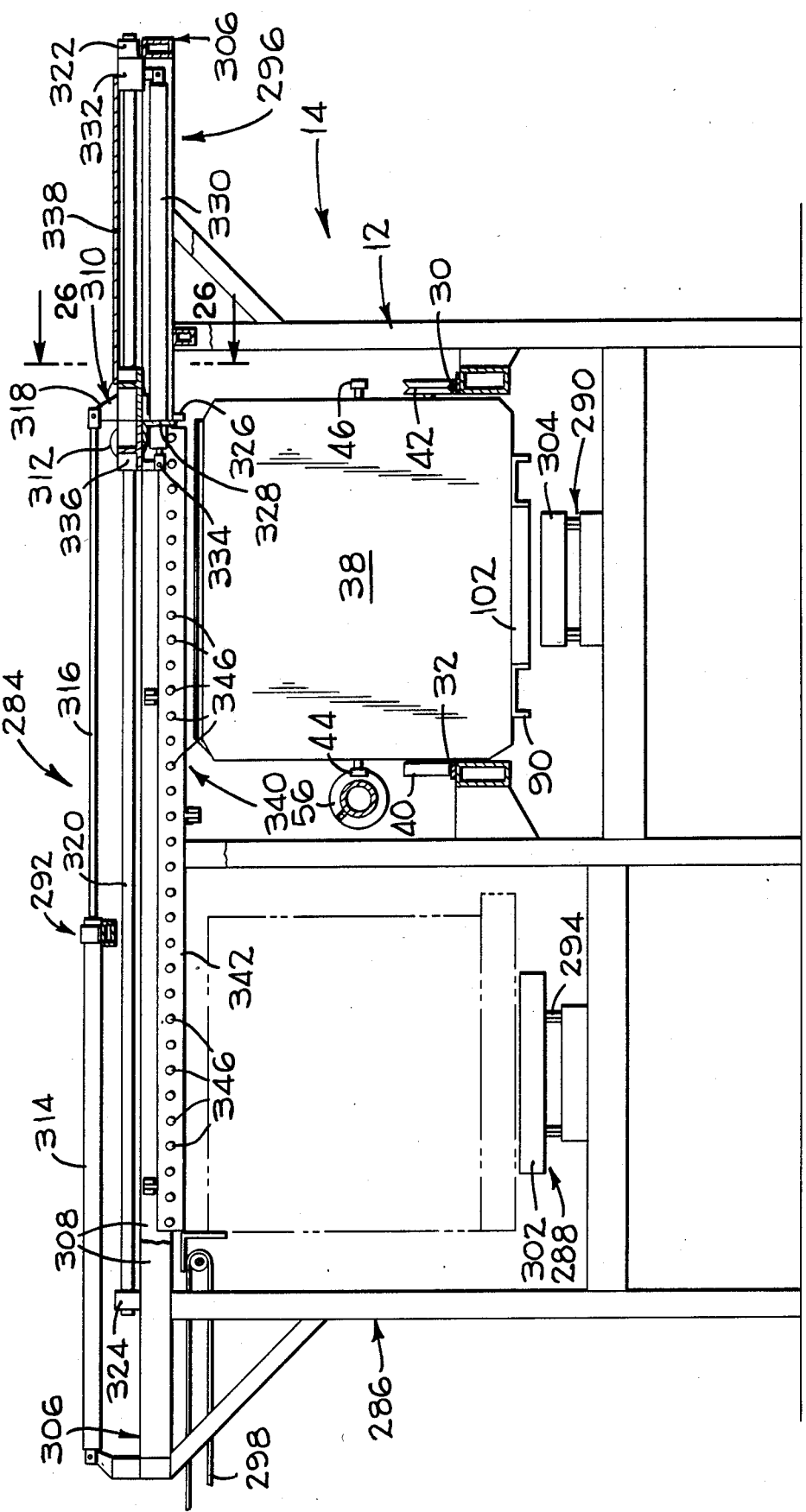

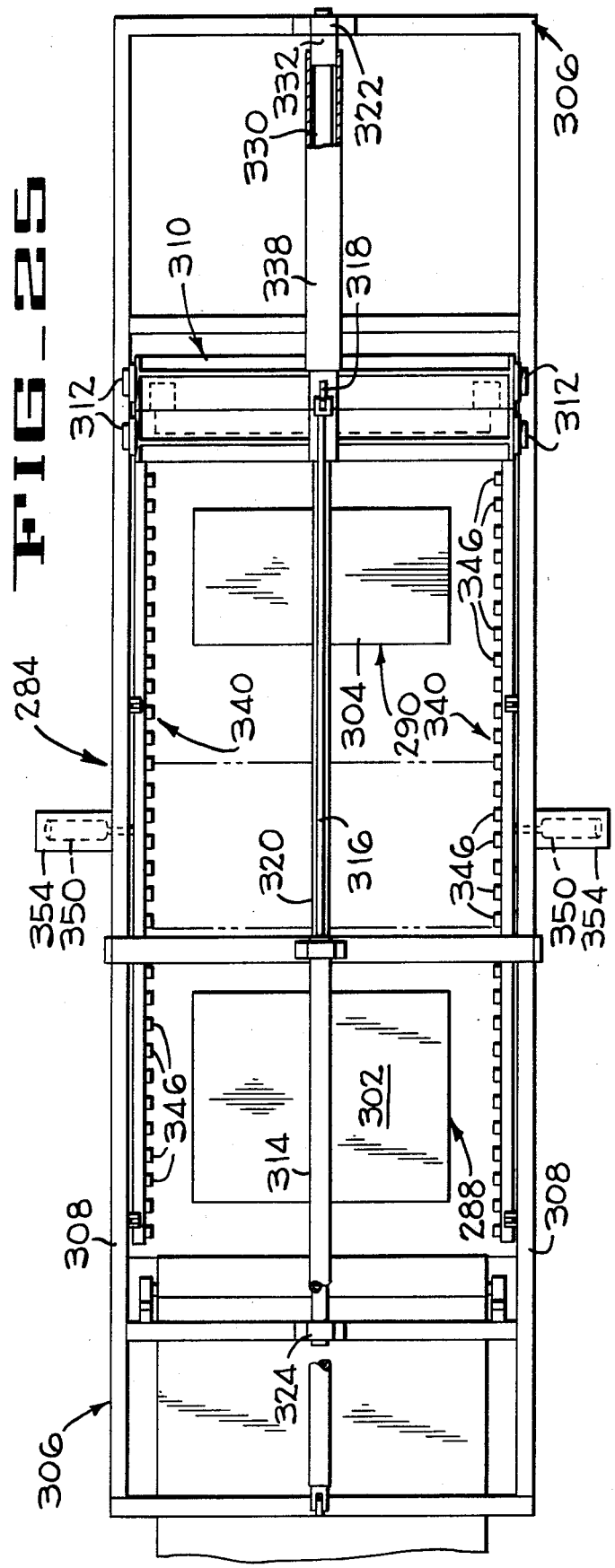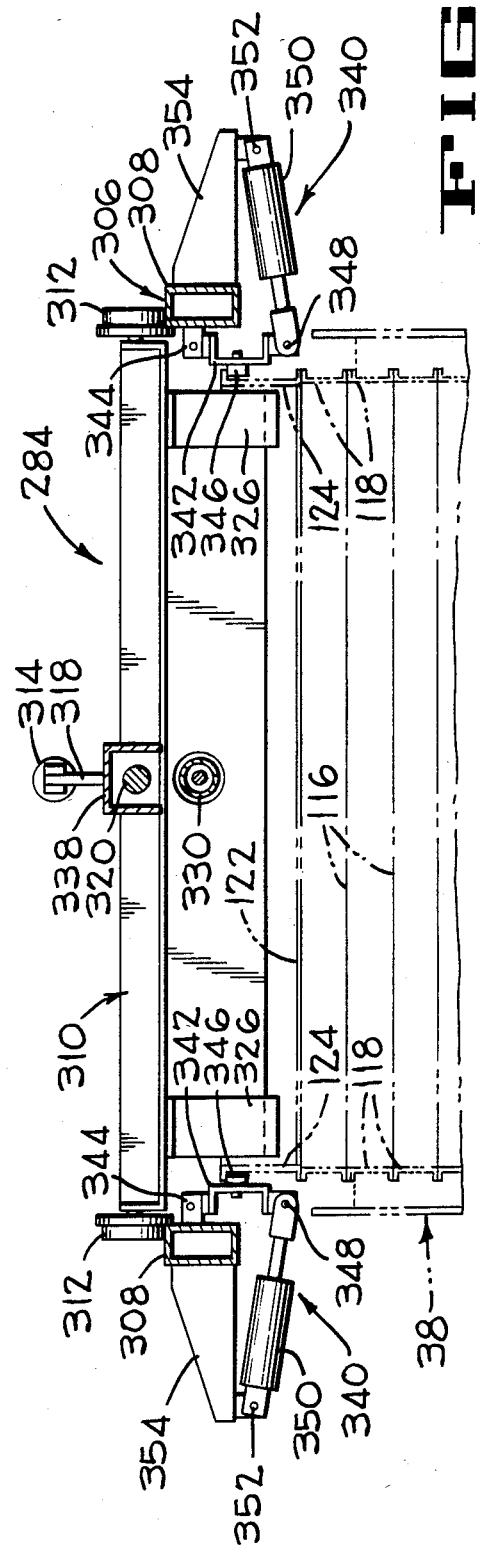

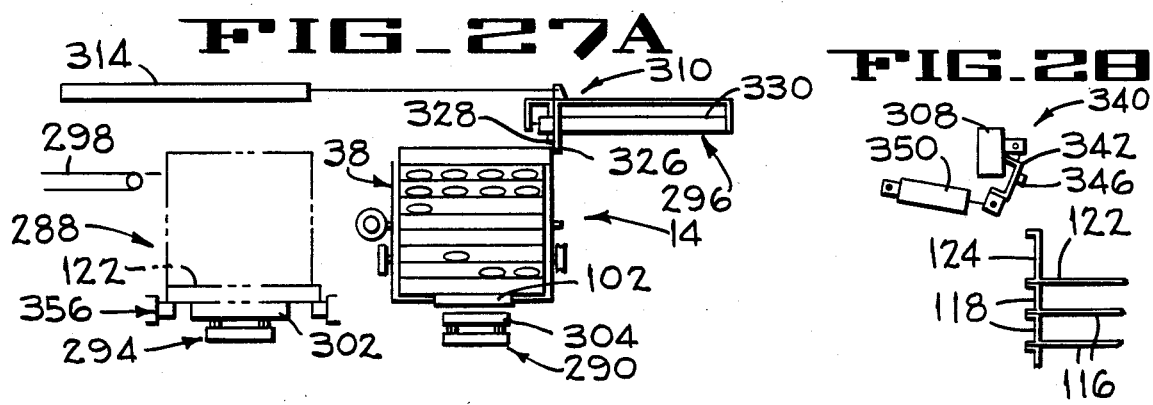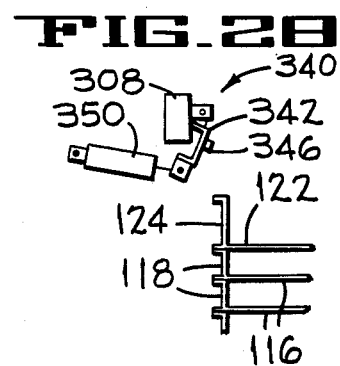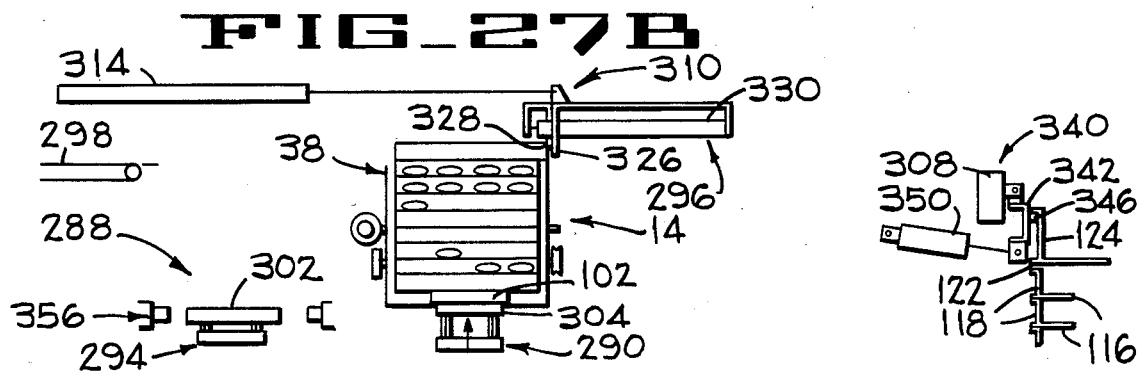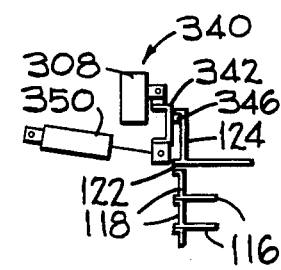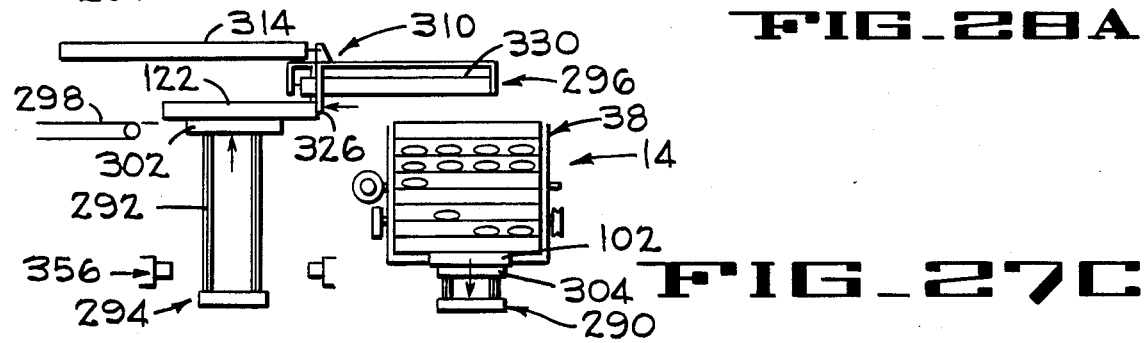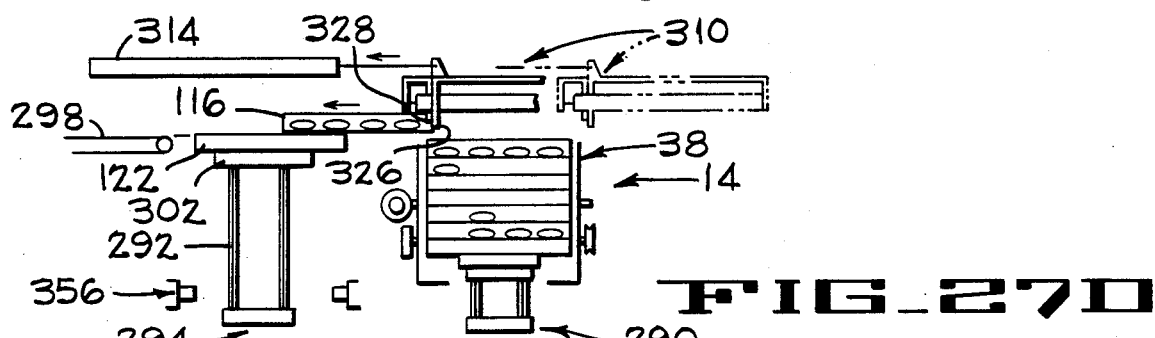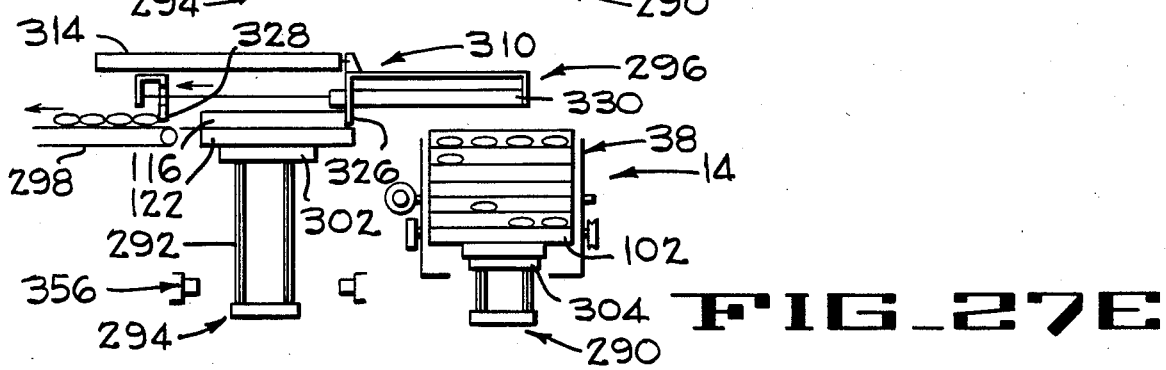

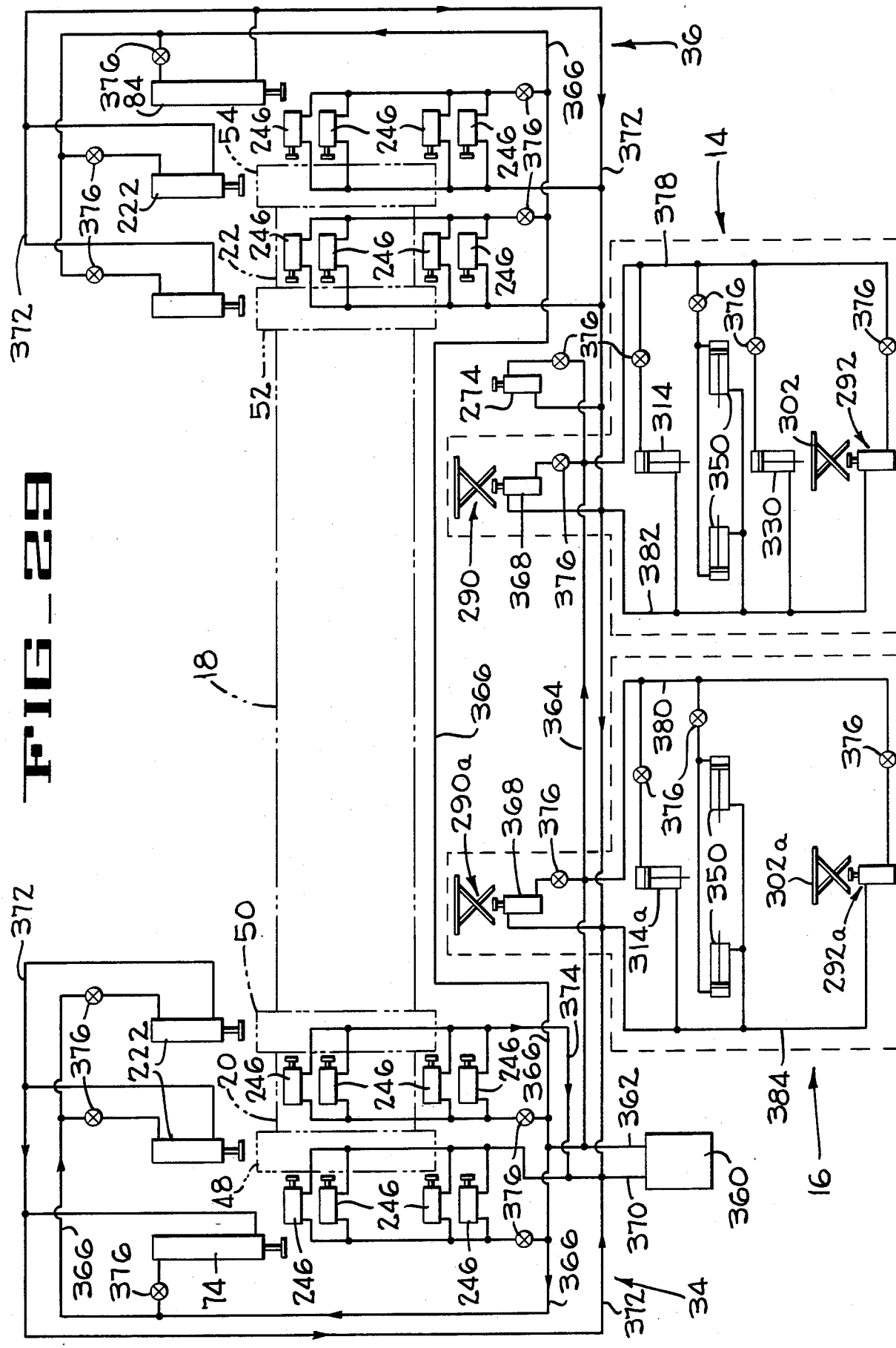

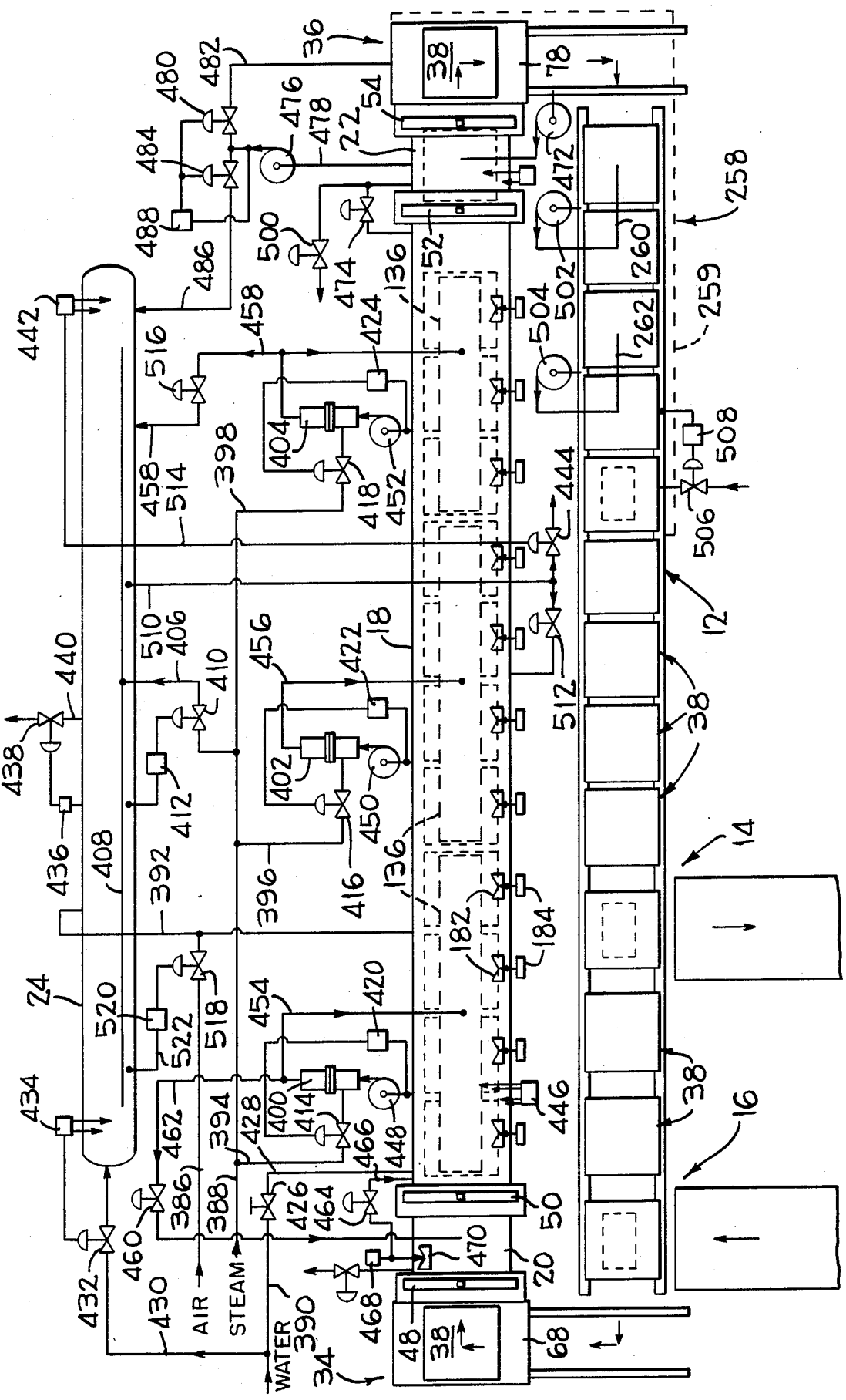
FIG_30

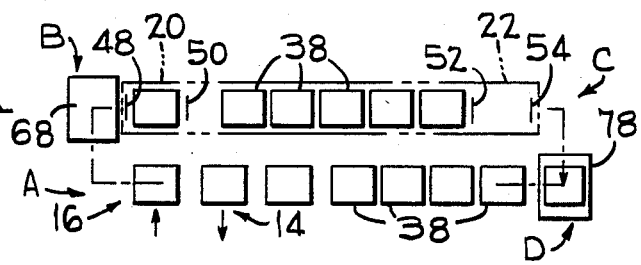
FIG_31A
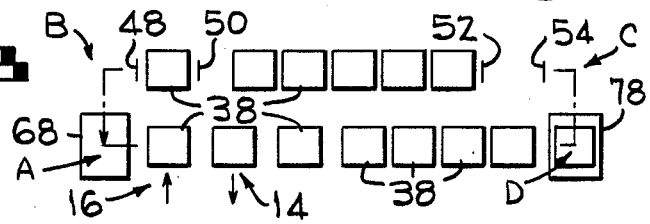
FIG_31B
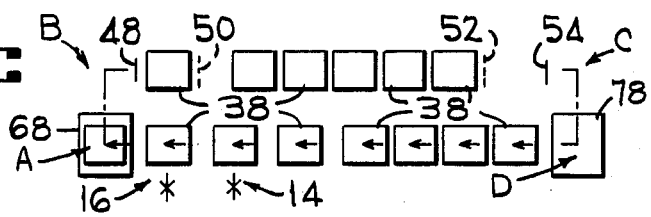
FIG_31C
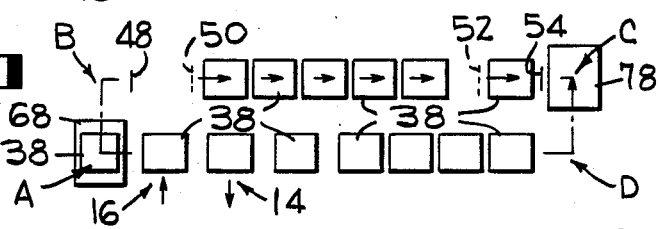
FIG_31D
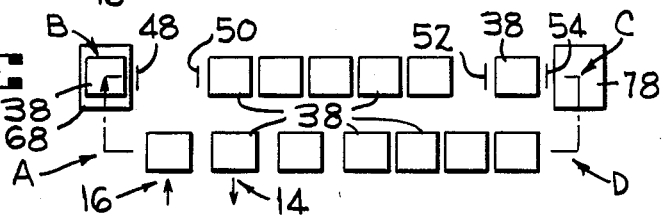
FIG_31E
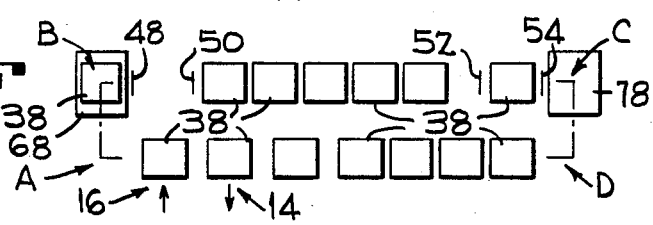
FIG_31F
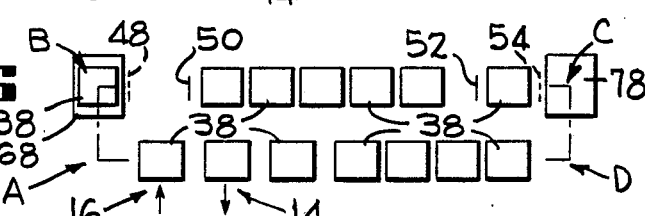
FIG_31G
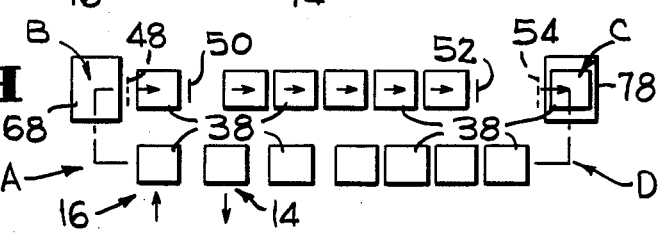
FIG_31H

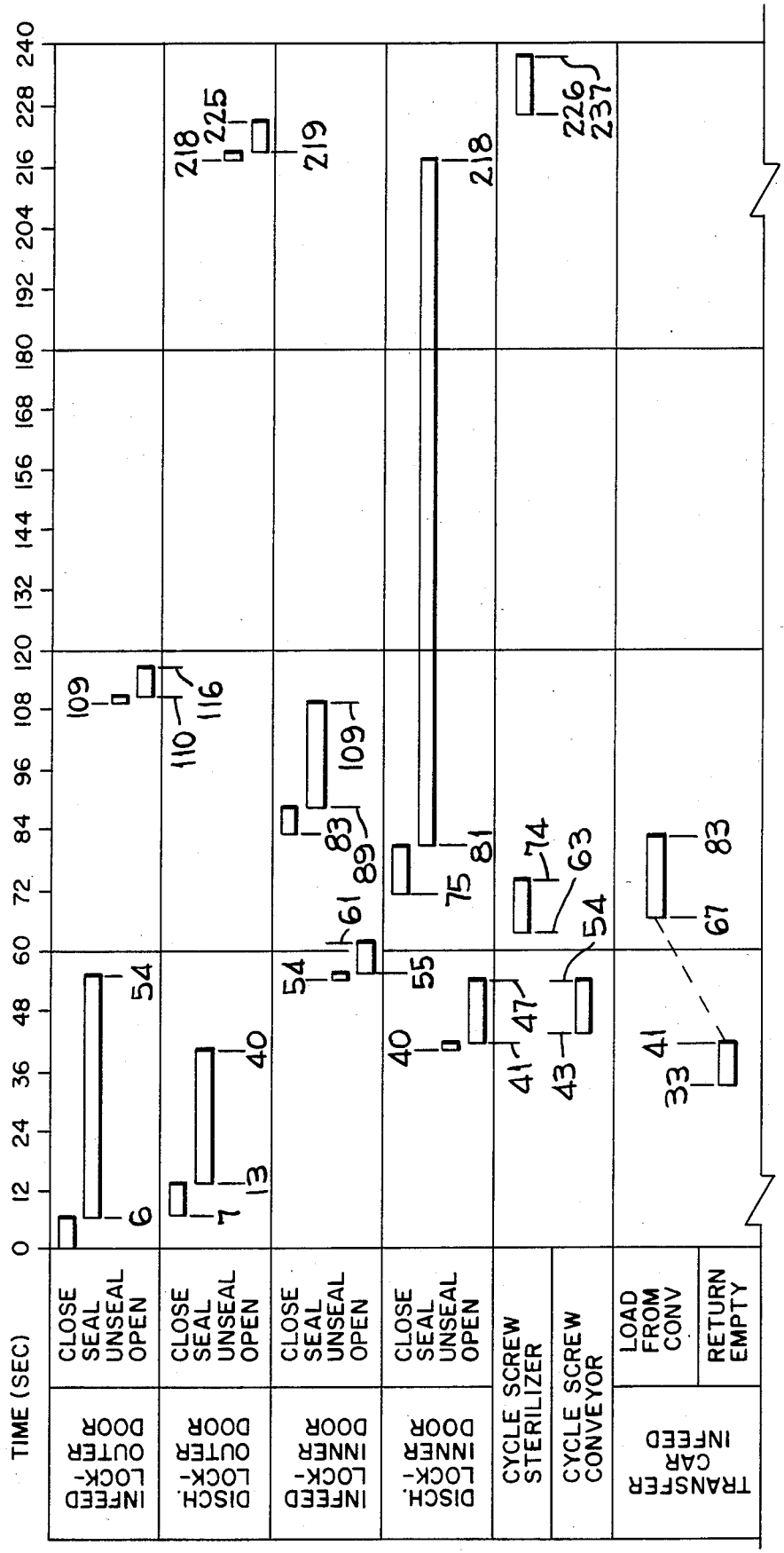
FIG_32A

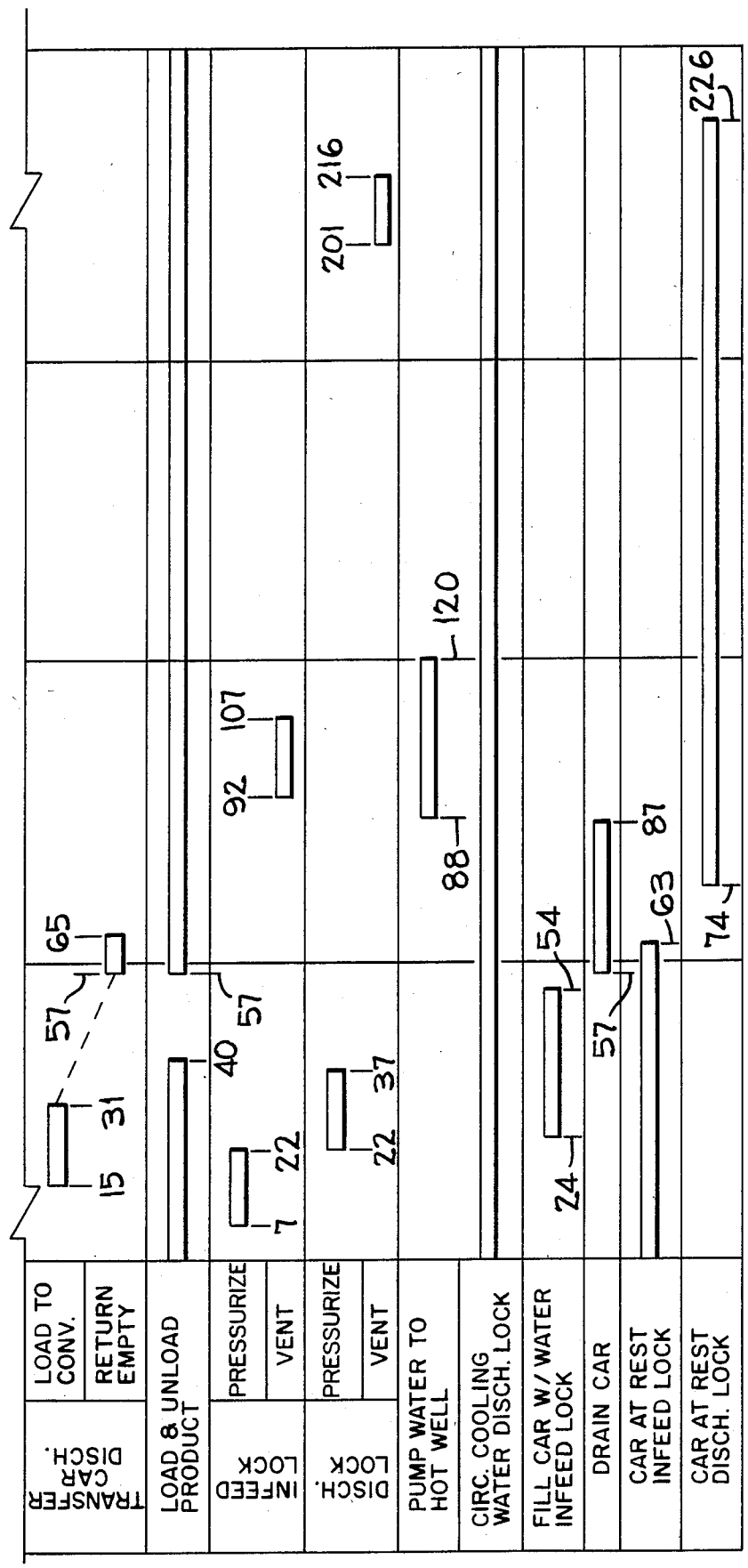

# 4,646,629

1

STERILIZING APPARATUS

BACKGROUND OF THE INVENTION

This invention relates to apparatus and methods for sterilizing food products and more particularly to sterilizers that effect continuous sterilization of food products carried by transportable cars movable in a closed loop.

Patented prior art relevant to the present invention include the U.S. Patents to Samuel A. Mencacci, U.S. Pat. Nos. 4,003,302; 4,164,590; 4,169,408; 4,179,986 and 4,196,225 issued, respectively, Jan. 18, 1977, Aug. 14, 1979, Oct. 2, 1979, Dec. 25, 1979 and Apr. 1, 1980. All of the Mencacci patents are assigned to the assignee of the present invention and by reference thereto it is intended that their disclosure be incorporated herein.

In accordance with the present invention a series of mobile cars, supporting packaged products such as food or pharmaceuticals, are moved in a closed circuit having means for sequentially loading and unloading each car with packages, means for introducing successive cars laden with packages into an entry lock where preliminary heating and pressurization of the car and the packages supported thereby occurs, thereafter moving the cars from the entry lock to a sterilizing chamber where the residence time of each car is sufficient to effect sterilization of the packaged products, moving the cars from the sterilizing chamber to a discharge lock where partial cooling and depressurization to ambient pressure occurs, moving the car from the discharge lock to a further cooling station, and finally moving each car to unloading and loading stations.

Further in accordance with this invention means are provided to reduce the energy required to raise, maintain and return a car and the containerized food carried thereby to ambient conditions. Such means may include a hot water management system that monitors, directly or indirectly, the rate of water flow, its temperature and its distribution such that the amount of water utilized is kept to a minimum by virtue of a short and confined loop of recirculation. More particularly, management of the sterilizing medium minimizes exposure to ambient conditions by promptly recirculating the liquid which has transferred a portion of its heat content to the packaged food.

BRIEF DESCRIPTION OF THE DRAWINGS

FIG. 1 is a perspective of the sterilizing system highlighting the compartmentalized treatment vessel, the plurality of cars for supporting food filled containers, and the closed path followed by the cars, FIG. 2 is a plan of the perspective shown in FIG. 1, FIG. 3 is a perspective of a car that supports a plurality of food containers for processing, FIG. 4 is a diagrammatic perspective showing elongate motor driven screws operable to effect movement of the cars along two legs of a circuit, FIG. 5 is an elevation illustrating the position of two adjacent cars one of which is located in the entry lock and the other supported by a cradle for movement from one transporting screw to the other, FIG. 6 is an elevation taken substantially along the line 6—6 of FIG. 5, FIG. 7 is a perspective of the cradle for transporting a car from one car feeding screw to the other, FIG. 8 is an elevation similar to FIG. 5 but the car (one being in phantom outline) is shown supported on a cradle located at the discharge lock, FIG. 9 is a perspective exploded view of one form of construction of a car, FIG. 10 is an enlarged vertical section taken substantially along the line 10—10 of FIG. 12 of a car illustrating the position of food packages supported on removable spaced partitions within the interior of the car, FIG. 11 illustrates the construction of the vertically spaced partitions whereby the partitions include and are integral with channels establishing the spacing of the partitions.

FIG. 12 is a plan view of a car illustrating the staggered relationship of the wheels, FIG. 13 illustrates one construction of a car wherein the water supplied thereto from an overhead manifold immerses each package at every level in a current of water and the water is continually discharged from the car through a plurality of apertures of a diameter decreasing with respect to a stabilized water level, FIG. 14 is another form of a car whereby water distributed from a manifold cascades vertically downwardly flowing around each package and the water flows through the bottom wall of the car through a plurality of holes therein, FIG. 15 is another form the car can take whereby water from the manifold floods the entire car, and after flowing past all of the individual packages, is discharged over a lip and some is collected in a trough located below the lip, FIG. 16 is another form of the car wherein the water distribution system and the flow passages do not necessarily immerse the upper layer of packages in sterilizing water, FIG. 17 is a perspective diagrammatic representation of a water collecting wier and a probe sensor signaling the absence of adequate water supply flowing through a car, FIG. 18 illustrates the manner in which water from a trough receiving the overflow from a car can be collected in a trough and recirculated to the overhead distributing tray, FIG. 19 is a front elevation of the entry lock illustrating the outer door open and the inner door closed and wherein a car is located for preliminary heating and pressurization, FIG. 20 is a section taken substantially along the line 20—20 of FIG. 19, FIGS. 21 and 22 are sections of FIG. 19 taken substantially along line 21—21 illustrating the mechanisms for clamping the door or gate in a fluid tight relationship with a seal, FIG. 24 is an elevation of the unloading station where the individual trays in the car are sequentially removed and sequentially stacked and stored for reinsertion into a car after packaged products are arranged on the individual trays, FIG. 25 is a plan of FIG. 24, FIG. 26 is a section taken substantially along the line 26—26 of FIG. 24, FIGS. 27A to 27E are diagrammatic operational views illustrating unloading of trays from a car and sequentially thereafter removing the products from each tray, FIGS. 28 and 28A diagrammatically illustrate operation of unloading means whereby successive trays are engaged after they have been raised to the level at which transfer occurs, FIG. 29 is a schematic of the hydraulic components for raising, lowering and clamping the doors of the lock and for raising and lowering jack mechanisms for loading and unloading the individual cars, FIG. 30 is a schematic of the water, steam, and air distribution systems utilized in preheating, heating and cooling the product laid in the cars.

FIGS. 31A to 31H illustrates circulation of the cars and a prefered sequence at which the doors to the inlet and discharge locks are operated, and FIGS. 32A and 32B when considered together show the sequential and concurrent functions which are performed over a span of 240 seconds with time being the abcissa and the various functions along the ordinate.

DESCRIPTION OF THE PREFERRED EMBODIMENT

Figure 23:
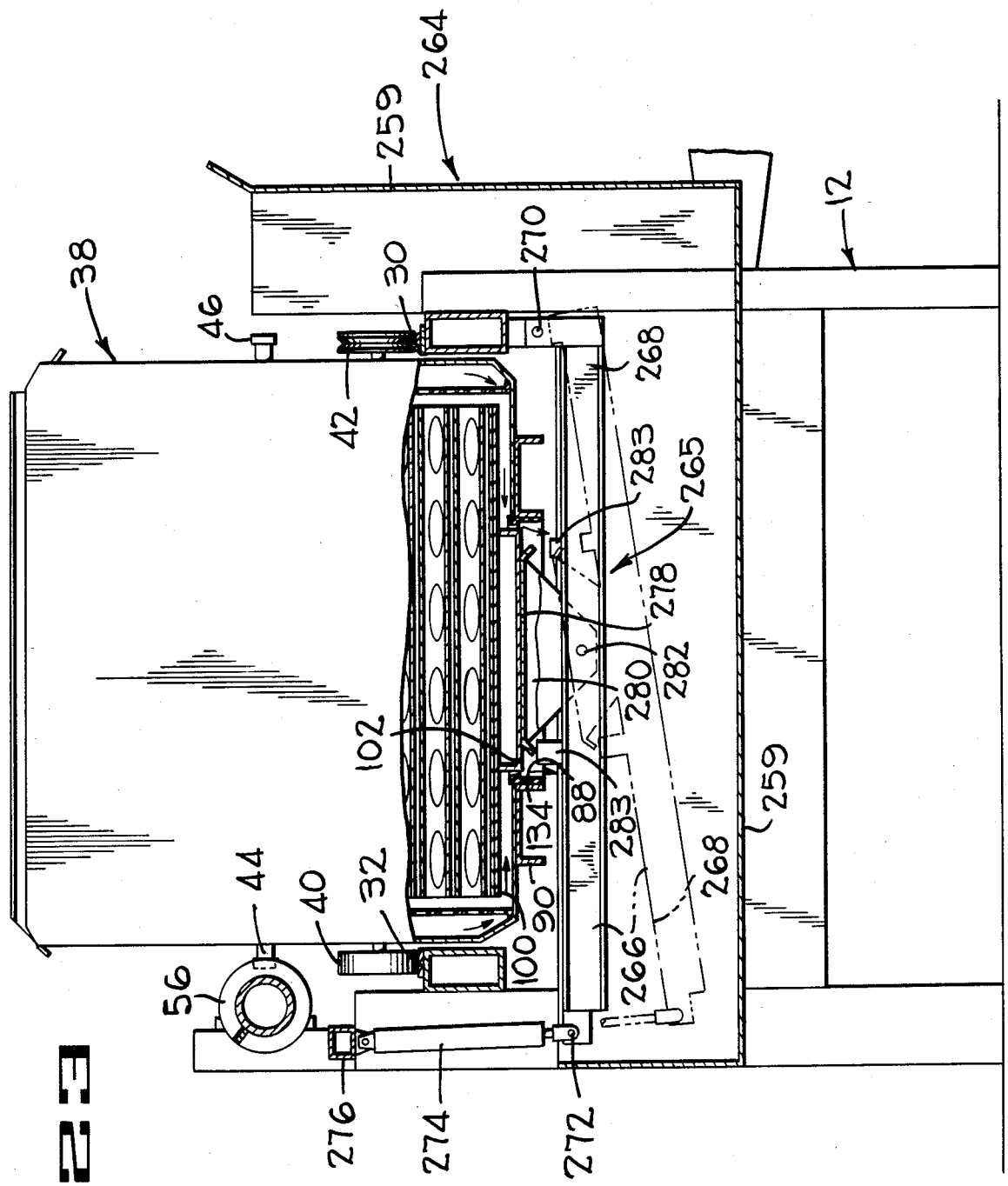
FIG. 23 is a transverse section of a car positioned at the station for dumping or discharging water from a car.

The sterilizing apparatus constructed in accordance with the principles of this invention is shown in FIG. 1 and is generally designated by the numeral 10. In general, the apparatus comprises a frame structure 12 rollingly supporting and guiding a plurality of mobile cars in a closed path to effect sequential unloading of each car at an unloading station 14, to load each cart at a loading station 16, introduce each car in a sterilizing apparatus comprising a sterilizing chamber 18, an inlet lock 20 and a discharge lock 22. Processing fluids, which can be water, air and/or steam are supplied to a hot well 24 and a quantity of such fluids flow between the sterilizing chamber 18, the inlet and outlet locks 20 and 22, respectively.

The U.S. Pat. No. 4,169,408 to Mencacci illustrates and describes a sterilizing apparatus having an inlet lock, a cooking chamber and a discharge lock having substantial similarities to the sterilizer of the present invention. However as will become apparent hereinafter the water distribution system, the construction of the cars and the manner in which the cars are translated in a generally rectangular loop, one side of which is defined by the sterilizing apparatus 18, departs substantially from the teachings of this Mencacci patent.

The frame structure 12 is of generally rectangular configuration formed with an elongate section 26, supporting a pair of parallel tracks 30 and 32, a transverse section 33 supporting and guiding a transfer mechanism 34 operating to transfer successive cars from the track section 26 to the opening of the inlet lock 20. In a substantially similar fashion, and by substantially similar means as a car is displaced out of the discharge lock 22, it is transferred to the section 26 by a transfer mechanism 36 supported and guided on another transverse frame section 35. Accordingly the general path followed by the cars is generally rectangular by virtue of the elongate frame 26, the frame section 33, the elongate path defined by the inlet lock 20 the sterilizing chamber 18 and the discharge lock 22 and the transverse frame section 35. For convenience points where a car changes direction are identified as A, B, C and D in FIG. 2.

A typical car which can be used with the sterilizing apparatus of the present invention is shown in FIG. 3 and identified by numeral 38. While various constructions that the car can take will be described hereinafter, it generally takes the form of a box having on one wall 39, a set of wheels 40 rollingly engagable with the track 32 and on the opposite wall 41 another set of wheels 42 rollingly engagable with the track 30. The walls 39 and 41 also rigidly supports a pair of driving lugs or dogs 44, mounted on the wall 39, and driving lugs or dogs 46, mounted on the wall 41. The track 32 takes the form of a flat strip of metal and the periphery or tire surface of the wheels 40 are also flat in conformity therewith. The track 30 however is of a V configuration and the periphery of the wheels 42 are of complementary shape. Not only does the V shaped track constrain the cars to move in the illustrated path but according to the preferred manner in which the cars are moved in a circuit or the rectangular path, the cars are subjected to disorienting forces which are resisted by the V shaped track 30 and the V grooved wheels 42.

The inlet lock 20 is defined by an exterior door 48 and an interior door 50. In a like manner the discharge lock 22 is defined by an interior door 52 and an exterior door 54. When a car 38 is located in the inlet lock 20 and the doors 48 and 50 are closed, a variety of pressure temperature and atmosphere conditions can be created by one or a combination of fluids that are supplied to the sterilizing apparatus. As described hereinafter, the sterilizing apparatus is connected to sources of air, steam and water whose temperature, pressure, flow-rate and distribution is controlled by conventional control devices associated with a piping system. Accordingly while the sterilizing apparatus will be described to fulfill a selected mode of operation, it should be appreciated that dwell times, pressure, temperature and the use of one or more fluids can effect sterilization of any product carried by the cars 38. To illustrate, the inlet lock 20 may be provided with sufficient water at a selected temperature to completely immerse the car located therein. Reduction of the time to achieve a desired temperature level of the car and its cargo of packages may be accomplished by supplying water at a temperature above the temperature in the sterilizing chamber 18 or the inlet chamber can be supplied with only steam, of any desired quality or superheated, to reduce the residence time of the car in the inlet chamber 20. While the disclosed sterilizing apparatus may be adapted to select one or more fluids at selected temperatures and pressures for sterilizing, it is particularly adapted to provide air overriding pressure and supply water at a rate to each car so that in its passage through the locks 20 and 22 and the sterilizing chamber 18, it is maintained in a flooded condition except that certain car constructions are provided with drains. On fulfilling these conditions the door 50 is opened and the car enters the compartment 18. Concurrently with the movement of a car 38 into the inlet chamber 20, a car is moved from the compartment 18 to the discharge lock 22 by closing the door 54 and opening the door 52. After entry into the discharge lock 22 the door 52 is closed and cool water is cascaded into the car. After the temperature of the car and the contents have been lowered, the pressure in the lock 22 is vented to the atmosphere, the door 54 is opened and the car is moved to the transfer mechanism 36.

Certain details of the transfer mechanism 34 and 36 are shown in FIG. 4 which also illustrates means for concurrently advancing the cars from the transfer mechanism 36 to the transfer mechanism 34 and from the transfer mechanism 34 through the inlet lock 20 the sterilizing compartment 18, to the discharge lock 22 and then to the transfer mechanism 36 thereby completing one circuit around the loop. The system for driving the cars from D to A and from B to C comprises an elongate screw 56 of constant pitch driven by a suitable speed reducer 58 preferably driven by a motor 60. While not illustrated in FIG. 4, the screw 56 is supported by a plurality of spaced bearings which are in turn carried by the frame structure 12. Another screw 62, formed with sections of different pitch and driven by a reducer 64 and a motor 66, translates the cars from the transfer mechanism 34 into the inlet lock 20, through the sterilizing chamber 18, into and through the discharge lock 22 and then to the transfer mechanism 36. On one end the screw 62 has a portion 62a having a greater lead which results in moving the car from the transfer mechanism 34 to and through the inlet lock at a greater rate than the rate advanced when the car is in the sterilizing chamber 18. In like manner, the other end 62b of the screw 62 has a greater lead to more rapidly advance the car from the sterilizing chamber 18 through the discharge lock 22 and thence to the transfer mechanism 36.

The transfer mechanism 34 comprises a generally rectangular cradle 68 having wheels 70 mounted at each corner rolling on tracks 72 which extend from transfer points A to B. A linear actuator 74, preferably hydraulic, has its output rods 76 connected to the cradle 68 whereupon its extension or retraction moves the cradle 68 between points A and B. In like manner the transfer mechanism at 36 comprises a similar cradle 78 provided with wheels 80 running on tracks 82. A linear actuator 84 also has its output rod 86 connected to the cradle for moving it between points C and D.

FIG. 5 illustrates in greater detail the transfer mechanism 34 by showing one of the cars positioned on the transfer cradle 68 at point A. The car 38 is also shown in phantom outline at transfer point B. As a car 38 is moved by the screw 56 to the transfer point A the cradle 68 is in that position. The cradle 68 includes track portions 30a and 32a defining extensions of the tracks 30 and 32. With the cradle 68 at transfer point A rotation of the screw 56 moves the leading car onto the track portions 30a and 32a of the cradle 68. On being properly positioned on the cradle 68, the actuator 74 is energized with pressure fluid causing retraction of the rod 76 and movement of the car laden cradle along the tracks 72 to the transfer point B. One of the tracks 72 may be V-shaped as track 30. It should be noted that the driving lug or dog 44 is withdrawn from the screw 56 and the dog 46 is inserted into the screw 62a whose rotation translates the car from transfer point B into the inlet lock 20. FIG. 6 shows a car 38 carried by the craddle 68 at transfer point A. Moreover the lugs or dogs 44 and their relationship to the lead of the screw portion 56 is illustrated.

FIG. 7 shows an unoccupied cradle 68 at the transfer point A. To properly locate and retain the cradle in the proper position to receive a car 38 abutments 85, which are part of the frame 33, and guide rails 87 are provided to restrain movement of the car 38 on the cradle while being moved from point A to B.

FIG. 8 is a view similar to FIG. 5 but it shows the car after it has been deployed on the cradle 78 by the screw portion 62b out of the discharge lock 22. This position is generally indicated by the transfer point C. On supplying the actuator 84 with pressure fluid the cradle 78 translates the car to the transfer point D with the car being shown at that point in phantom outline, as will be described in greater detail hereinafter. The frame structure 12 and the frame section 35 carry a cooling water trough 259 for containing a body of cool water which is utilized for sufficiently cooling the car and its contents prior to arriving at the unloading station 14.

FIG. 9 shows a perspective exploded view of one form that a car 38 can take. The car body proper has a bottom wall 87 formed with an opening 88 of any desired shape but for purposes of this disclosure a rectangular opening is shown. The bottom wall is rigidified by welding channel members 90 surrounding the opening 88. Upwardly extending side walls 39 and 41, integral with the bottom wall 87 and interconnected with transverse walls 96 and 98, form the box like structure of the car 38. A plate 100 is supported by the bottom wall 87 and is provided with a projecting built-up rigid section 102 formed to fit in the opening 88. Secured to each corner of the car is an elongate rail 104 provided with a slot 106 for removably receiving plates 108 formed with a plurality of slotted openings 110 and also formed with flanges 112. To facilitate insertion of the plates 108 into the slots 106 the lower corners are chamfered at 114. As will be explained more fully hereinafter, each car is provided with a plurality of vertically spaced solid trays or partitions for supporting a plurality of packaged products, either fully immersed in water at a sterilizing temperature or, in the event it is determined that the particular product lends itself to being sterilized by water streaming through the successive shelves or partitions and over the product, the partitions may be perforated. Further, as shown in FIG. 9, a plurality of one form of partitions 116 are made of solid sheet metal and have channel members 118 secured to opposite sides of each partition. Merely for purposes of rendering the partition 116 more rigid stiffener plates 120, being shaped to increase the beam strength, are secured, either by riveting or welding, to the lower surface of each partition 116. The channel members 118 serve the principal function of providing a space between the adjacent partitions and a subsidiary purpose of cooper ating with the loading and unloading mechanism at the loading station 16 and the unloading station 14. When it is desired to effect sterilization by flooding the car 38 and continually flowing hot water therethrough, a top plate 122 is provided also formed with channels 124 on opposed edges and one end of the channels are innerconnected by a barrier 126 of approximately the same height to assist in retaining a quantity of water on the plate 122. Water is supplied at a rate (approximately 350 gpm per car) so that a pool of water will be contained between the channels 124 and a barrier plate 126. However water is continually discharged from the top plate downwardly into the car through an opening 128 defined by the plate 122 and an inclined strip 130 interconnected to the ends of the channels 124. By virtue of this construction water supplied directly onto the plate 122 flows downwardly until the car is filled with water and then flows over a lip 132 for collection at the bottom of the sterilizing chamber 18 or, as will be explained hereinafter, into a trough provided with means for determining the flow rate and the water temperature supplied to each car.

FIG. 10 illustrates the relationship the various components shown in FIG. 9 assume when assembled. Water at a sterilizing temperature supplied to the top plate 122 flows downwardly to the chamber defined by one of the plates 108 and the side wall 39, across the individual channels defined by the shelves or partitions 116 and to the space defined by the side wall 41 and the other plate 108 and over a lip 132. As long as sterilizing water is supplied to the top plate in sufficient quantities to establish and maintain a level of water LW which is above the lip 132 the difference in elevation will insure a flow of water through the car.

To insure retention of the water in the car during the sterilizing process deformable sealing strips 134 are fixed to the inner web of the channel 90 surrounding the opening 88.

FIG. 11 illustrates the spacing of the various partitions or trays 116 created by the channel members 118. Aligned stacking of the plurality of partitions is accomplished by means, hereinafter explained, at the loading station 16.

FIG. 12 shows the staggered relationship of the wheels 40 and 42. In making one complete circuit a car 38 traverses six track joints. Four joints are encountered as a car is moved on and removed from the cradles 68 and 78 and two joints are encountered as a car enters and leaves the sterilizing chamber 18 from the inlet lock 20 and the discharge lock 22, respectively. While the gaps between the track sections are kept to an absolute minimum, the sets of wheels 40 and 42 of each car 38 are mounted on axles which are staggered so that in traversing a track joint neither more than one wheel at a time will be traversing the joint. FIG. 12 diagrammatically illustrated the staggered relationship of the wheels 40 and 42 and a track joint 45 negotiated by the car during its movement to or from the cradles 68 or 78. The geometric center of the car is indicated by lines intersecting at 47 which in some instances may also indicate the center of gravity. The V-grooved wheels 42 are rotatably mounted to rotate about axies 49 while the wheels 40 are rotatably about axies 51. The respective axies 49, associated with V-grooved wheels 42, and 51 associated with flat wheels 40, are longitudinally spaced from each other by distance L.S. Such a relationship of the wheels creates the condition that when a car traverses a track joint such as 45 only one of the six wheels of the car will negotiate the joint at any one instance. Under these circumstances the likelihood of a car becoming stuck or requiring excessive force to ensure its continued movement is diminished and under most normal circumstances obviated. While the preferred car construction of the present invention shows three wheels on each side it should be readily appreciated that displacement of the rotational axes of the wheels if four wheels were involved, that is two on each side, the same beneficial result would obtain.

FIGS. 13, 14, 15 and 16 illustrate modified car constructions that may be used to effect sterilization. All of the cars are illustrated as residing in the sterilizing compartment 18. The car construction selected for sterilization would primarily depend on the type of product to be sterilized, its package and the flow rate of sterilizing fluid that should be used. The illustrated car constructions do not include the plate 100 but it is to be understood that such a plate would be part of its configuration since, as will be made evident hereinafter, the plate 100 or an equivalent thereto are desirable to achieve loading and unloading of the cars at the stations 14 and 16.

As mentioned previously the various car constructions are shown located in the sterilizing compartment 18. The sterilizing compartment is preferably provided with three water distributing trays 136 each of which have a bottom wall 137 formed with a plurality of apertures to allow water to stream downwardly into the cars. Water at sterilizing temperature is supplied to the tray 136 by a line 138. The arrows 140 are intended to designate streams of water flowing into the cars from the tray 136. The car construction shown in FIG. 13 comprises a top wall 144 provided with a water discharge outlet 146 feeding water to a vertical channel 148 which in turn distributes water to each layer of package product P regularly spaced and supported on a plurality of vertically spaced horizontal trays or shelves 150. Water is discharged from channels 152, defined by the vertically spaced shelves, through openings 154 formed in a wall 156 of the car. Water is collected at the base of the compartment in a pool 158 and continually removed through a line 159 at a rate which insures that the bottom wall of the cart or any part thereof is not immersed therein since the water collected in the pool 158 is at a lower temperature and thus would interfere and possibly avoid proper sterilization of the packages P on the lowermost shelf. Water removed from the pool 158 is reintroduced through the line 138 after it has been brought up to the desired sterilizing temperature.

FIG. 14 shows another form the car can take. Constructional features similar to the above described cars are identified by the same numerals. The car, generally indicated as 38b, comprises an upper tray 160 having a bottom wall 162 having formed therein a plurality of holes 164 whose number and pattern of spacing being determned by the flow rate and the distribution desired. Ideally, the pattern of holes 164 will be determined to insure constant flow rate to and around each of the packages P. As in the prior constructions, the car includes a plurality of horizontally extending vertically spaced plates 166 each of which are also provided with a plurality of holes 167 to insure that water derived from the top tray 160 impinges upon and flows around each of the packages deployed on each of the plates 166. It is to be understood that a bottom plate similar to plate 100 shown in FIG. 9, is also provided in the car construction shown in FIG. 14 but the plate 100, including the built up rigid section 102, are provided with apertures or holes 169 substantially in alignment with the holes 167 since flow of water out of the car is through the bottom plate. The rate at which water is supplied by the hot water line 138 is sufficient to partially flood and maintain a water level in the upper tray 160 to insure the objective of constant flow over and keeping submerged the packaged products carried by each of the shelves or plates 166.

The construction of the car shown in FIG. 15, and designated as 38c, includes the tray 144 having the opening 146 allowing water to flow into a channel 170 which is defined by the side wall 39 an inner perforated wall 172.

Thereafter, and as indicated by the arrows, water floods all packages P supported on the plurality of horizontally extending, vertically spaced, plates 174 which thus define a plurality of channels. The water then flows through a perforated plate 176 into a channel 178 defined by the plate 176 and the side wall 41. The portion of the water flows over a lip 180 into a weir box 182 mounted on the side wall of the sterilizing compartment 18. The weir box 182, more particularly illustrated in FIG. 17, is associated with a thermocouple and a liquid level detector 184 which provides a signal in the event the temperature or the flow rate of water through the car is insufficient. Flow out of the car 38c also occurs through a drain opening 186 formed on a bottom of the channel 178.

The car shown in FIG. 16 is generally designated by the numeral 38d and its principle differentiation over the cars previously described relates to the fact that the packages on the uppermost shelf need not necessarily be fully immersed in water at sterilizing temperature. Water discharged from the tray 136 cascades downwardly into a tray 188 which has a bottom wall 190 provided with a plurality of holes 192. Water cascades downwardly onto the uppermost shelf 194 laden with packages and flows to a vertical channel 196 defined by the side wall 39 and an innerwall 198 formed with aperatures 199. From the channel 196 water flows horizontally through the apertures 199 and across each shelf and obviously flows across all of the packages supported by each of the shelves. The cooled water enters another vertical channel 200 defined by another apertured wall 202 and the outer side wall 41. The cooled water flows upwardly into the channel 200 and over a lip 204 and into the weir box 182. Use of a car constructed as illustrated in FIG. 16 would be considered where the packaged food product on the uppermost shelf could achieve sterilization by being partially immersed or such a car may be used without using the uppermost shelf 194 for containing packaged products.

With the objective of achieving economic performance principally accomplished by keeping the decline of the sterilizing water temperature to an absolute minimum and thus realize significant saving, a system schematically illustrated in FIG. 18 may be used. While the illustrated car 38 is substantially identical in construction and mode of operation as the car described with relation to FIG. 10, all of the water flowing over the lip 132 is collected into a trough or channel thus avoiding the creation of a pool on the bottom of the sterilizing compartment 18. More particularly a channel or trough 204 is secured in any suitable manner, as by welding, to the side wall of the compartment 18. The trough is formed with a vertical wall 206 having its upper end within a projected area of the lip 132 so that water cascading over the lip is discharged into the trough 204. A pump 208 pumps water from the trough by a line 210 and then to a heat exchanger 212 by a line 214. Heated water from the heat exchanger is again distributed to the tray 136 by the line 138.

FIGS. 19 and 20, as well as FIGS. 21 and 22, illustrate the general construction, including the means for effecting operation of exterior door 48 and the interior door 50 of the inlet lock 20. Description of the outlet lock is not believed necessary since its construction and mode of operation is essentially the same. FIG. 19, which shows an elevation of the exterior door 48 of the inlet lock, illustrates an enclosed housing 216 which includes spaced side walls 218 having their upper ends interconnected by a wall 220. The walls are sufficiently spaced apart to allow free reciprocating motion of the door 48. Raising and lowering of the door is achieved by a linear actuator 222 having the end of its projecting rod connected to the top edge of the door 48 at 224. The lower end of the enclosed housing 216 is integral with a flange 226 mating with a similar flange 228 which is integral with a lower housing 230. The lower housing is formed with a square opening 232 having dimensions adequate to allow free movement of the car in and through inlet lock. As shown in FIG. 20 the lower housing comprises an outer plate 234 containing the opening 232 and an inner plate 236 which is welded to the shell 238 of the inlet lock 20.

On closing of the doors 48 or 50, means are provided to establish an air tight seal operated by conventional means after lowering of the doors. As shown in FIG. 21 the door 48 has its vertical edges formed with slots 240 in which are positioned vertical guides 242 which are fastened to an elongate rod 244 of a linear actuator 246 mounted on a bracket 248. The rod 244 is guided for reciprocation in bored blocks 250 and 252. As shown in FIG. 19, each guide 242 is associated with two linear actuators 246 placed as indicated in FIG. 19. Between the outer plate 234 and the inner plate 236 a heavy section metal frame 254 surrounds the square opening 232. The metal frame 254 is welded to the outer plate 234 and its inner edge is formed to receive a continuous seal 256. When the doors are lowered, conventional control means are energized to admit pressure fluid to all of the actuators 246 associated with the door that is lowered. On pressurizing the rod end of the actuators 246 the elongate vertical guides 242 displace the door toward the seal 256 effecting compression thereof and obviously establishing a fluid tight seal.

As indicated above all of the doors 48, 50, 52, and 54 are constructed in a substantially identical fashion and operate as described above. When it is desired to open any door, controls are actuated to extend the rod 244 of the actuators 246 relieving the compression of the seal 256 and thereafter additional controls may be actuated commanding the linear actuator 222 to raise the door.

Each car 38 is transferred from the discharge lock 22 to the cradle 78 at transfer point C and then to transfer point D by the transfer mechanism 36. The cars thereafter are translated by the screw 56 along the track 26 and come under the influence of cooling means 258 which essentially comprises overhead spray bars 260 and 262 that distribute large volumes of water into cars positioned thereunder. As shown in FIGS. 1 and 2 it is preferred to locate, at any one time, four cars under the spray bars and since the cars are moved from transfer point D to transfer point A at programmed intervals, as will be hereinafter more specifically described, the residence time of each car under the spray bars will be substantially equal to the time elapsed in transferring four cars from the discharge lock 22 to the transfer point D.

When successive cars are displaced by the translating screw 56 toward the transfer point A and beyond the spray bar 262 means, generally indicated by the numeral 264, is operative, to discharge the water contained in the car before the car proceeds to the unloading station 14. It will be recalled, and as illustrated in FIG. 10, the bottom wall of the car includes a removable plate 100 integral with a ribbed or built up portion 102 residing in the opening 88 which is circumscribed by channel members 90. As also explained above, the opening 88 is provided with a peripheral deformable seal 134 to insure retention of water by the car during its transit through the inlet lock 20, the sterilizing compartment 18, the discharged lock 22 and during the cooling process effected by the spray bars 260 and 262.

When the car assumes the position containing the water discharge means 264, illustrated in FIG. 23, means 265 are provided for raising the plate 100 in order to dump the water contained in the car in a channel 259 underlying the water discharge means 265. To effect upward displacement of the plate 100 (FIG. 23) a frame work 266, including transverse structural members 268 extending transversely under the car, are provided and are pivotally connected at 270 to the frame work 12.

The other end is pivotally connected at 272 to a linear actuator 274 which in turn is pivotally connected to a bracket 276. Between the structural members 268 a rigid pad 278 is integral with generally triangular plates 280 being pivotally connected at 282 to the structural members 268. Stop buttons 283, extending between the structural members 268, limit rotation of the pad 278 to insure that it is oriented properly to make planar contact with the ridged built up section 102.

In operation when a car is located at the water dumping or discharge station 264 controls are actuated to retract the rod of the linear actuator 274 and thus raise the frame work 266 from the phantom outline position to the full outline position shown in FIG. 23. As a consequence the pad 278 contacts the ridged built up section 102 thereby raising the plate 100 and as a consequence allows water contained in the car to flow to the channel 259. Representative flow out of the car is indicated by the arrows in FIG. 23.

After water has been removed from a car it is translated by the screws 56 along the tracks 30 and 32 to the unloading station 14 which functions to selectively remove the top plate 122 and the partitions 116. It is to be appreciated that while a specific reference has been made to the car construction shown in FIG. 10, sequential removal of the partitions for all forms of cars shown and described herein may be achieved by the preferred form of the unloading mechanism to be presently described. The arrangement of the unloading means at the unloading station 14 is shown in FIGS. 24, 25 and 26 while its overall operation is diagrammatically illustrated in FIGS. 27A-27E, 28 and 28A. The unloading means is generally designated by the numeral 284 and it comprises a frame structure 286 extending transversely of the frame structure 12 and is integrally connected therewith. A car 38 is shown positioned at the unloading station and adjacent thereto means 288 are provided for collecting the top plate 122 and the various partitions 116. The general mode of operation of the unloading means 284 involves incrementally raising the bottom plate 100 a distance equal to the spacing of the partitions 116 by elevating means 290, grasping the top plate 122 and laterally transferring it by a transfer mechanism 292 to the tray collection means 288 which includes elevating means 294 which is similar in construction and mode operation as the elevating means 290. Before the trays are sequentially stacked on the collecting means 288 means 296 are provided for removing the packages from the trays which are received and transported by a conveyor 298.

The elevating means 290 and 294 may take a variety of forms such as a hydraulic cylinder or a screw jack but it is preferred to incorporate hydraulically operated scissors mechanisms (FIG. 4) operative to incrementally effect raising and lowering of a table 302 associated with the elevating means 294 and the pad 304 associated with the elevating means 290. It is to be understood that the elevating means 290 and 294 are concurrently displaced in opposite directions, that is to say when a car is to be unloaded the elevating means 294 is raised to its highest level while the elevating means 290 is at its lowest level as indicated in FIG. 24. On raising the elevating means 290 to allow engagement of the top plate 122 by the transfer mechanism 292, which transfers the top plate to the tray collecting means 288, the elevating means 294 is at its highest level locating the table 302 so that on release of the top tray it comes to rest on the table 302. To unload the partitions 116 the elevating means 290 is incrementally raised while the elevating means 294 is incrementally lowered the same amount thereby effecting transfer of the partitions 116 and the top plate 122 to the table 302.

The preferred construction of the transfer mechanism 292 is illustrated in FIGS. 24, 25 and 26 where it will be seen to comprise a generally rectangular frame structure 306 supported in a horizontal plane by the frame structure 12 and the frame structure 286. The opposed elongate members 308 of the frame 306 define tracks along which a crosshead 310, including wheels 312, is reciprocated by means of a pneumatic or hydraulic cylinder 314, having the end of its rod 316 connected to a plate 318 which in turn is secured to the crosshead 310. The crosshead 310 is supported and guided for movement by a guide rod 320 supported in blocks 322 and 324. The crosshead 310 includes a downwardly extending lip 326 engaging the adjacent edge of the top plate 122 and the partitions 116 which are sequentially extracted from the car as described above. A transversely extending bar 328 is operative to strip the products supported by each partition and transfer them to the conveyor 298. In particular, a linear actuator 330 is suspended at its head end from a block 332 slidably mounted on the guide rod 320 and its output rod is connected at 334 to another block 336 also being slidably mounted on the guide rod 320. The crosshead 310 is rigidly connected to the block 332 by a generally semi-circular housing 338 and thus upon actuation of the cylinder 314 the package removing means 296 is also translated (from right to left as viewed in FIG. 24) when the various inserts in the car 38 are sequentially moved to the tray collecting means 288.

To effect transfer of the product laden partitions from the car 38 to the tray collecting means 288, tray supporting and guiding means 340, supported by the elongate members 308, are provided. With reference to FIGS. 25 and 26 it will be seen that the supporting and guiding means 340 comprise elongate channels 342 pivotally secured to brackets 344 secured to the elongate members 308 and mounting a plurality of rollers 346 on the vertical web of the channels 342.

As described in connection with the car construction shown in FIG. 10, the top tray 122 and the partitions 116 are provided with channel members 124 and 118, respectively. The top tray 122 and the partitions 116 are shown in phantom outline in FIG. 26 where it will be seen that the rollers 346 engage the upper ledge of the channels 124 and thereby facilitate translation of the removable contents of the car 38 to the tray collecting means 288.

The manner in which the rollers 346 sequentially engage the channels 124 and the channels 118 associated with the partitions 116, is best illustrated in FIG. 26. The channel 342, in addition to being pivotally mounted to brackets 344, are also pivotally connected at 348 to a linear actuator 350 which has its head end pivotally connected at 352 to an outwardly extending bracket 354 secured to the elongate members 308. In view of this construction energizing the actuator 350 to retract the rod causes the channel 342 to pivot outwardly (see FIG. 28) while extending the rod positions the channels 342 as shown in FIG. 26.

According to the above, operation of the unloading means 284 involves the following sequence. When a car is at the unloading station 14 the actuators 350 are retracted pivoting the channels 342 outwardly as shown in FIG. 28. The transfer mechanism 292, and of course the removing means 296, are located as shown in FIG. 24. The elevator 294 raises the table 302 to the proper elevation to receive the upper tray 122 when it is released by the tray separating and guiding means 340. With the upper tray located at the elevation shown in FIG. 26 the actuators 350 are energized pivotally displacing the channels 342 inwardly toward each other until the rollers 346 are under the lip of the channels 124. The actuator 314 is then energized causing the pusher 326 to engage the tray and move it along the rollers to the tray collecting means 288. Once at this location the actuators 350 are retracted pivoting channels 342 outwardly and releasing the upper tray for reception by the table 302. The actuator 314 is then energized to traverse the unloading means 284 to the position shown in FIG. 24. Then the elevating means 290 raises the partitions in the cart sufficiently to allow the pushers 326 to engage the adjacent edge of a partition. Actuators 350 are extended to position the rollers 346 under the lips of the channels 118 and the actuator 314 is energized to traverse the crosshead 310 over the tray collecting means 288. At this time the tray collecting means has been lowered on increment sufficient to avoid contact with the previously transferred top tray 122. Actuator 330 is supplied with pressure fluid to extend its rod and the bar 328 pushes the packaged products on to the conveyor 298 which may transport the products to a carting station (not shown). The above sequence of events is repeated until all partitions have been removed from the car 38 and stacked on the table 302.

The above described sequence of operations fulfilled by the unloading means 284 is diagrammatically illustrated in FIGS. 27A-27E. FIG. 27A shows a car 38 located at the unloading station 14 where the elevating means 290 is aligned with the section 102 of the bottom plate 100. The phantom lines at the tray collecting station 288 represent a full complement of partitions 116 and the top tray 122 stacked on the table 302. The full complement of partitions 116 and the top tray is transferred to a transverse track common guideway or conveyor 356 by lowering the table 302. The full complement of trays may be moved manually or mechanically to the loading station 16 where the successive partitions are loaded with package product and reinserted into a car located at the loading station. FIG. 27B illustrates the table 302 unburdened of the tray and the partitions at which time sequential unloading of the top tray and the partitions can commence. FIG. 27C shows the elevating means 294 raised to receive the top tray 122 while the elevating mechanism 290 has been raised the amount sufficient to allow transfer of the tray 122 from the car 38 to the table 302. FIG. 27D shows a partition 116 in the course of being transferred from the car 38 to the table 302. It should be noted that the elevating mechanism 294 has been slightly lowered and the elevating mechanize 290 has been slightly raised to expose the tray 116 sufficiently to enable the pusher bar 328 to effect transfer. FIG. 27E illustrates removal of the packaged product from the partition 116 which is accomplished when the linear actuator 330 is extended transferring the packaged products from the partition to the conveyor 298 by the bar 328.

The loading station 16 which is diagrammatically illustrated in FIG. 4, is substantially similar in construction and mode of operation as the unloading station 14 however certain operating elements are not necessary since, as the successive partitions are unstacked and placed upon an elevating mechanism 294a, loading of the product on each partition 116 may be done manually. After loading of a partition 116 it is engaged and moved to elevating means 290a by an actuator 314a associated with a loading mechanism substantially similar to unloading means 284. Accordingly, loading means at the loading station 16 would not require the actuator 330, or any device similar thereto, since the products are manually placed on successive partitions 116 prior to loading into a car. In the event manual loading of each partition is deemed uneconomic a loading system involving use of vacuum cups can be incorporated to engage a plurality of align products and transfer them from a conveyor 358 to a partition underlying the vacuum transfer device. Single rows or a full compliment of articles can be placed on a partition depending upon the manner chosen to arrange the packages thereon.

FIG. 29 diagrammatically illustrates a system for controlling the various actuators and cylinders associated with opening and closing the doors of the inlet and discharge locks, the transfer mechanisms 34 and 36, the unloading station 14 and the loading station 16. Synchronized operation of the components of the fluid system illustrated in FIG. 29 can incorporate whatever logic, such as solenoid valves, limit switches, timing switches etc., that is desired to effect programmed operation of the various fluid cylinders. Accordingly specific disclosure of such logic systems, due to their conventional nature, is not believed necessary.

FIG. 29 illustrates the sterilizing chamber 18 in phantom outline associated with the inlet lock 20 and the discharge lock 22. In addition the phantom outline enclosures designate the unloading station 14 and the loading station 16. Hydraulic fluid at a selected pressure is supplied to the system from a pump 360 to a line 362 being in communication with lines 364 and 366 supplying pressure fluid to actuators 368 which are effective to raise and lower the elevating means 290 and elevating means 290a associated, respectively, with the unloading station 14 and the loading station 16. In addition pressure fluid from line 364 is connected to the linear actuator 274 which is located at the water discharge means 264.

All of the linear actuators 246 associated with the doors of 48, 50, 52 and 54 are connected to the pressure line 366. As will be recalled, the actuators 246 will fulfill the function of clamping the doors in fluid tight relationship with the seal when they are closed. Pressure fluid from line 366 is also supplied to the actuator 74, associated with the transfer mechanism 34, the actuator 84, associated with the transfer mechanism 36 and the actuators 222 which are operative to both raise and lower the doors for the inlet lock 20 and the discharge lock 22. A return line 370, connected to branch lines 372 and 374 complete the fluid circuit. A plurality of valves 376 operatively connected to the control logic system, control, in the sequence desired, the extension and retraction of all actuators or cylinders. It should be noted that pressure fluid from the discharge line 362 is distributed to the actuators at the unloading station 14 by branch line 378 and to the loading station 16 by branch line 380. Return of fluid to the line 370, from the unloading station 14, and the loading station 16 is by lines 382 and 384, respectively.

The supply, conditioning and the paths taken by the various fluids to effect preheating, sterilization, precooling and cooling of the packaged products contained in the cars is shown in FIG. 30. The fluids used are identified as such and their point of introduction is also shown. More particularly, the sterilizing system uses air, steam and water which are introduced, respectively, in lines 386, 388, and 390. The air line 386 is connected to branch line 392, supplying air at a selected pressure to the hotwell 24 and the sterilizing chamber 18. Branch lines 394, 396 and 398 supply steam, respectively, to heat exchangers 400, 402 and 404. Steam is also supplied to the hotwell 24 by a line 406 to an elongate distributing bar 408 in the hotwell 24. The admission of steam by line the 406 to the hotwell is controlled by a temperature responsive valve 410 whose operation responds to the temperature detected by a control 412. Each of the heat exchangers 400, 402 and 404 is provided with a temperature responsive valve 414, 416 and 418 each of which responds, that is, open or close, to temperature controllers 420, 422 and 424.

Water from the line 390 is introduced into the sterilizing chamber 18, on opening manual valve 426, through a line 428. Water is also distributed on a demand basis to the hotwell 24 by line 430 in which a valve 432 is connected and it is operated, to admit or interrupt water flow to the hotwell 24, by a level controller 434. A certain level of pressure is maintained in the hotwell 24 by a pressure detecting device 436 operating a valve 438 connected to the hotwell by a line 440. The hotwell 24 is provided with another water level detecting device 442, signalling operation of a valve 444 for discharging water from the hotwell in the event the level of water therein is higher than desired.

The sterilizing chamber 18 is provided with three of the elongate trays 136 which, as explained previously (FIGS. 13–16), are formed with a plurality of holes on its bottom wall to cascade water into the cars located there below. The sterilizing chamber 18 contains three trays 136, but it is to be understood one tray or more than three trays can be incorporated therein depending upon the approach taken to effect sterilization. For example, if it is desired to raise the temperature of the products supported by the car at a slow rate which may be dictated by the container or the products contained therein, more than three trays may be involved. In a similar vein, if it is desired to effect some cooling while the cars are in the sterilizing chamber 18 and prior to their location into the discharge lock 22, separate trays 136 can be incorporated provided with water at different temperature to be distributed to the car prior to its location in the discharge lock 22.

The entry lock 20 and the discharge lock 22 are supplied with water, either at sterilizing temperature or a temperature which is lower or higher depending upon the containers and the product packaged therein, and air under pressure. With the doors 48 and 50 closed, the temperature of the car and its contents in the inlet lock 20 achieve the pressure conditions of the sterilizing chamber 18 and undergo some preheating before entering the chamber 18.

In preparation for operation, the sterilizing chamber 18 is supplied with a predetermined quantity of water from the line 390 by opening the valve 426 and allowing water to flow into line 428 to the sterilizing chamber 18. A water level detector 446 is of the type providing two ranges of high-low water levels which is diagrammatically illustrated by two sets of arrows of different lengths. With a source of water in the bottom of the sterilizing chamber 18, pumps 448, 450 and 452 withdraw water from the bottom of the chamber and discharge it through the heat exchangers 400, 402 and 404 associated with each pump. From the respective heat exchangers, water is returned by lines 454, 456 and 458 to the plurality of trays 136. Maintaining a selected temperature of the water discharged to the trays 136 by the lines 454, 456, and 458 is achieved by temperature controllers 420, 422, and 424 that detect water temperature at the inlet of the pumps 448, 450 and 452 and in response thereto open or close valves 414, 416 and 418 supplying steam from the inlet 388 and the branch lines 394, 396 and 398.

On locating a car in the inlet lock 20 and with the doors 48 and 50 closed, the pressure is raised to a level substantially equal to the pressure of the sterilizing chamber 18 by opening a valve 464 in line 466. Thereafter valve 460, in line 462, is opened admitting water at approximately sterilizing temperature to flood the car. A water level probe 468 detects the level of water in a weirbox 470 signalling, through a main control panel, closing of the valve 460.

On locating a car in the discharge lock 22 and with door 54 closed, a continuously operating pump 472, having its inlet connected to a source of cold water, cools the car and its contents. Then door 52 is closed and after sufficient cooling has occurred valve 500 is opened venting the discharge lock 22. Also, concurrently with the operation of pump 472, a pump 476, having its inlet connected by line 478 to the bottom of the discharge lock 22, withdraws water therefrom which is, depending on its temperature, returned to the channel 259 through valve 480 and line 482 or to the hotwell 24 through the valve 484 in the line 486. Whether water from the pump 476 is directed to the line 482 or line 486 is determined by a temperature sennsing device 488 connected to detect the temperature of the water discharged by the pump 476.

Before the door 54 is opened and the car residing therein is transferred to the cradle 78, the pressure in the discharge lock 22 is brought to ambient conditions by closing valve 474 and opening valve 500 venting the discharge chamber 22. The door 54 is thereafter opened and the car is translated to the cradle 78 and it is moved to the transfer point D where the screw 56 transports the car to the cooling means 258 which includes the spray bars 260 and 262. Pumps 502 and 504 withdraw cold water from the cooling channel for discharge to the spray bars 260 and 262.

In the event the cold water channel 259 requires additional make-up water valve 506, connected to the main water supply, is opened by a control 508 thereby admitting water to the cooling channel 259. Line 510 connected to the hotwell 24 supplies water at sterilizing temperature from the hotwell to the sterilizing chamber 18 on opening the valve 512 which may be operated manually, by the central control panel, or associated with a probe level control such as 446. Valve 444 connected to level control 442 by a line 514 is operative in response to signalling of an overflow condition by the level control 442 to discharge or drain hot water from the hotwell 24.

In response to the water level control 446 or some other level control situated in the sterilizing chamber 18, excess of hot water is returned to the hotwell by the line 458 on opening a valve 516 in such line.

The admission of air to the hotwell and the sterilizing chamber 18 by the lines 386 and 392 is controlled by a valve 518 whose opening and closing is controlled by a pressure sensing device 520 in line 522.

It will be observed by inspection of FIG. 30 that a plurality of weirboxes 182 and probes 184, detecting water temperature and flow, are located at the position that each car will occupy during its transition through the sterilizing chamber 18. In the event, one or more of the probes signals lack of water flow or a deviation from a nominal temperature, the operator is thereby provided with information on the specific car involved. When the car exits the discharge lock 22 its inspection is undertaken. A variety of factors could give rise to this condition such as rupture of a package and distributing its contents in the waterflow path, improper placement of the top wall or the partitions or the improper alignment of the plate 100 such that the establishment of a seal effected by deforming the seal strip 134 (FIG. 10) is not achieved. As mentioned above the probe 184 may combine water level detection and a temperature probe since it is possible that while appropriate waterflow rates are achieved, the temperature of the water may be below acceptable levels for sterilization. The temperature probe associated with each weirbox is preferably connected to a computer which not only will identify the position of the car when such a condition is detected but will monitor the progress of that car so that when it is positioned on the cradle 78, it can be identified, inspected and removed from the system, if desired.

The system of distributing of air, water and steam as shown in FIG. 30 lends itself to a variety of modifications depending upon the food product being processed and the containers used for packaging. In all instances, a high degree of efficiency and flexibility, related to the principal object of energy conservation, is achieved. One specific example of energy conservation involves the use of pump 476 and valves 480 and 484 operating, depending on water temperature, to connect the discharge of the pump to the hotwell or to the cooling water channel 259. By the inclusion of additional pumps associated with recirculating hot water in the sterilizing chamber 18 and by providing more trays 136 microcooling may be accomplished in the sterilizing chamber adjacent to the discharge lock 22.

FIGS. 31A to 31H depicting a preferred sequence of events for controlling car movement in the generally rectangular circuit and accordingly a sequence in which the doors to the inlet lock 20 and the discharge lock 22 may be operated. The condition illustrated in FIG. 31A shows the cradle 68 located adjacent the inlet lock 20 and the presence of a car 38 in the inlet lock. The outlet lock is vacant and the car removed therefrom is shown on the cradle 78 at the transfer point D. The convention used in these figures as to whether the doors of the locks 20 or 22 are opened or closed is to indicate a closed condition by a solid line and an open condition by a dash line. The next sequence, shown in FIG. 31B, illustrates the cradle 68 translated to the transfer point A. FIG. 31C shows the car at the loading station 16 transferred to the cradle 68 while all the cars between the leg defined by transfer point A and D have been moved from right to left. Also at this time, the inlet lock has been pressurized and the inner door 50 is open. The inner door 52 of the discharge lock 22 has also been opened. FIG. 31D illustrates movement of a car from the inlet lock 20 into the sterilizing chamber 18 and movement of the leading car in the sterilizing chamber to the discharge lock 22 since the inner door 52 is opened. The cradle 78 is returned to the position C for receiving the car from the discharge lock after it has been partially cooled and depressurized. During this stage, cars to be unloaded and loaded are positioned at the unloading and loading stations 14 and 16, respectively. FIG. 31E shows the cradle 68 returned to the position adjacent the inlet lock 20 which has its doors 48 and 50 closed and the inner door 52 of the discharge lock 22 is also closed. Cooling and depressurizing of the car located in the discharge lock 22 occurs. FIG. 31F repeats the condition of FIG. 31E since during this time unloading and loading are in progress. FIG. 31G shows the outer door 48 of the inlet lock 20 opened and the outer door 54 of the discharge lock also opened. FIG. 31H illustrates the introduction of the car from the cradle 68 into the inlet lock 20, since the door 48 is opened, and removal of a car from the discharge lock 22 through the open door 54. It is to be understood that this sequence of events repeats itself to effect sequential insertion and removal of cars from the sterilizing chamber 18.

FIGS. 32A and 32B, considered as a unit, illustrate a timing sequence covering a time span of 240 seconds which would be the time elapsed for any one car to be indexed into and out of one lock. As shown in FIGS. 32A and 32B, time is measured along the "abscissa" and the functions performed are legend in two left hand columns as an "ordinate" axis. While the functions performed and the time required to their fulfillment is deemed to be revealed by mere inspection of the drawings, the following abbreviated description is intended to briefly explain the sequence followed by the components identified on the ordinate axis and the concurrent operation during the 240 second time span.

In the time span of 60 seconds, the outer door 48 of the infeed lock 20 is closed in 6 seconds and sealed for 54 seconds. The outer door 54 of the discharge lock 22 is closed within a span of 6 seconds commencing at 7 seconds and sealing of that door commences at 13 seconds and terminates at 40 seconds. The inner door 50 of the infeed lock 22 is unsealed in 1 second commencing at 54 seconds and is opened within 6 seconds commencing at 55 seconds. The inner door 52 of the discharge lock 22 is unsealed in 1 second commencing after the elapse of 40 seconds and is opened within 6 seconds covering a time span between 41 seconds and 47 seconds. The car translating screw 56 commences operation in 43 seconds and terminates at 54 seconds and the cradle 68, operative to transfer cars from transfer point B to transfer point A commences operation at 33 seconds and terminates at 41 seconds. The cradle 78, in moving from transfer point C to transfer point D, starts operation at 15 seconds and terminates at 31 seconds while return of the car to transfer point C commences at 57 seconds. To load and unload product from the cars at the unloading station 14 and the loading station 16 utilizes a time span of 223 seconds commencing at 57 seconds and ending at 40 seconds from the referenced "0 seconds". Pressurization of the infeed lock commences at 7 seconds and ends at 22 seconds while pressurization of the discharge lock commences at 22 seconds and ends at 37 seconds. The circulation of cooling water does not experience cycling and, therefore, is continuance while to fill a car in the infeed lock with water commences at 24 seconds and ends at 54 seconds. Draining of a car at the water discharge station 264 commences at 57 seconds and the residence time of a car in the infeed lock commences at 0 seconds. The residence time of a car in the infeed lock is approximately 63 seconds starting from the 0 second reference.

During the time span from 60 seconds to 120 seconds, the outer door 48 of the infeed lock 20 is unsealed in 1 second starting at 109 seconds and is opened in 6 seconds commencing at 110 seconds. The inner door is closed within 6 seconds commencing at 83 seconds and sealed in 20 seconds commencing at 89 seconds. The inner door 52 of the discharge lock 22 closes in 6 seconds commencing at 75 seconds and is sealed commencing at 81 seconds. The cycle screw conveyor 62 in the sterilizing chamber 18 operates for a span of 11 seconds starting at 63 seconds. Movement of the cradle 68 from transfer point A to B commences at 67 seconds and ends at 83 seconds and venting of the inlet lock 22 commences at 92 seconds and terminates at 107 seconds. Pump 476 operates for a period of 32 seconds commencing at 88 seconds to return water to the hotwell through line 486 and draining of the car at the station 274 terminates at 87 seconds. A car commences its residence time in the discharge lock at 74 seconds.

During the time span from 120 seconds to 180 seconds, no sequential operation occurs. From the time span of 180 seconds to 240 seconds, the outer door 54 of the discharge lock is unsealed in 1 second commencing at 218 seconds and opened in 6 seconds commencing at 219 seconds. The inner door 52 of the discharge lock remains sealed after the elapse of 218 seconds and the screw 62 in the sterilizing chamber operates for a period of 11 seconds commencing at 226 seconds. The discharge lock is vented over a span of 15 seconds commencing at 201 seconds and a car in the discharge lock commences its transfer to the cradle 78 at 226 seconds.

An overall simplified explanation of the operating sequence commencing from initial start-up is as follows. Commencing with the condition that the system is completely dry and cold and the tanks and cars are empty, the first action will be to supply the system with water by opening valve 432 until the water level in the hotwell, as detected by level control 434, indicates a proper level. While the sterilizing chamber can be supplied with water from the hotwell through line 510 and valve 512, acceleration of this process can be achieved by opening manual operable valve 426. With the water level in the sterilizing chamber 18 being of sufficient height, pumps 448, 450 and 452 are started and concurrently steam valves 414, 416, 418 and 410 are opened. After a predetermined level of temperature has been achieved, cars are loaded at station 16 and transported to the inlet lock 20. With a car in the inlet lock, valve 460 is opened introducing hot water into the car until an overflow condition is reached which may be sensed by a probe, and upon sensing such an overflow condition, valve 460 is closed. It is to be recalled that while a car is in the inlet lock, the pressure is raised to equal the pressure in the sterilizing chamber 18 and, thereafter, the interior door 50 is opened allowing the car to enter the sterilizing chamber 18. When a car reaches the discharge lock, pump 472 is circulating cool water into the car to effect microcooling and preliminary cooling before discharge of the car to the cradle 78. Pump 476 operates concurrently with pump 472 to return, depending upon the controller 488, hot water to the hotwell 24 through the line 486 or to the cool water channel 259. As the cars arrive at the cooling means 258, pumps 502 and 504 are started distributing cool water from the cooling channel 259 to the spray bars 260 and 262. Thereafter, and as explained above, as the cars reach the discharge means 264, the water therein is drained to the cooling channel 259 and thereafter the car progresses to the unloading station 14 and the loading station 16.

Although the best mode contemplated for carrying out the present invention has been herein shown and described, it will be apparent that modification and variation may be made without departing from what is regarded to be the subject matter of the invention.

What is claimed is:

1. A thermal treatment apparatus comprising at least one mobile car containing a plurality of packages containing thermally treatable products;
   means for moving said car in a path having a plurality of processing stations,
   said processing stations comprising a thermal treatment station including a pressurizing chamber, a sterilizing chamber and a depressurizing chamber,
   a station for supplying cool water to the car and the treatable products,
   a station including means for unloading the processed containers from the car,
   a station including means for loading the car with containers in preparation for embarking on another circuit of the path,
   and means for draining the cool water from the car before unloading occurs.

2. The thermal treatment apparatus according to claim 1 wherein said draining means is located at a station following said cooling station.

3. A thermal treatment apparatus comprising at least one mobile car containing a plurality of packages containing thermally treatable products;
   means for moving said car in a closed path having a plurality of processing station;
   said processing stations comprising a thermal treatment station including a pressurized chamber, a sterilizing chamber and a depressurizing chamber;
   a station for cooling the car and the treatable product;
   a station for unloading the processed containers from the car;
   a station for loading the car with containers in preparation for embarking on another circuit of the path;
   said closed path being substantially rectangular thereby defining vertices at the intersection of adjacent sides of the rectangle, said means for moving the car in the path comprising elongate rotatable screws extending along opposite sides of the path and operable to move the car to one pair of diagonally opposite vertices, and means for supporting and carrying the car to the other pair of diagonally opposed vertices.

4. An apparatus for thermally treating packaged products in a chamber comprising a plurality of cars each of which contain a plurality of said products, said cars being moveable in a generally rectangular path whose verticies define points at which the cars change direction of movement, means for sequentially receiving and supporting a car at one vertex and transporting it along a linear path to another vertex, and means for removing the car from said receiving and supporting means and introducing the car in said chamber.

5. The thermal treatment apparatus according to claim 4 wherein said receiving and supporting means comprises a cradle and means for moving said cradle between said verticies to effect sequential introduction of cars in said thermal treatment chamber.

6. The thermal treatment apparatus according to claim 5 wherein said means for moving said cradle between the verticies comprises a linear actuator operated when a car is deployed on said cradle for movement adjacent the thermal treatment chamber and to the vertex where a car is received and supported by said cradle.

7. A thermal treatment apparatus according to claim 4 further comprising means for sequentially receiving and supporting a car exiting from said treatment chamber, said means being moveable between verticies one of which is adjacent the exit opening of said treatment chamber, and means for translating said receiving and supporting means to the other vertex.

8. A sterilizing apparatus comprising a sterilizing chamber for receiving a receptacle containing a plurality of packages for sterilization, means for supplying said chamber with a liquid at a temperature to effect sterilization within a selected time and a gaseous fluid at a selected super-atmosphric pressure, said liquid being continually supplied to said recepticle in quantities that create overflow of liquid from said recepticle, means for directing the overflow from said receptacle to one of its upper edges and means adjacent the overflow edge for receiving the overflow, for monitoring the temperature and flow rate from the receptacle.

9. The sterilizing apparatus according to claim 8 further comprising means for withdrawing and heating the liquid from said overflow receiving means and returning the heated liquid to said recepticle.

10. A car for use in the sterilizing apparatus of the character described comprising a rectangular box-like structure supporting interiorly thereof a plurality of vertically spaced perforated shelves on each of which a plurality of packages are disposed, a water receiving well overlying said perforated shelves, said well having its bottom wall perforated to allow water to flow therefrom downwardly to the packages supported on said perforated shelves, said car having its bottom extrior wall perforated thereby discharging water fed thereto from the car, and means for supplying water at sterilizing temperature and at a sufficient rate to maintain a body of water in said well.

11. A car for use in the sterilizing apparatus of the character described comprising a rectangular box-like structure supporting interiorly thereof a plurality of vertically spaced solid shelves each of which support a plurality of packages, a water receiving well overlying said shelves, opposed vertical channels extending the full depth of the car and communicating with the passageways defined by the vertically spaced shelves, said well being supplied with liquid at least at a sterilizing temperature and having its bottom wall perforated to supply liquid to all of the passageways, one of said vertical channels having an overflow edge which is below the passageway immediately below the bottom wall of said well whereby packages in said passageway are partially immersed in liquid.

12. A sterilizing apparatus comprising a sterilizing chamber for receiving at least one mobile car, means for intermittently moving said car through the chamber and continually supplying the car with liquid at a temperature to effect sterilization, means for discharging the liquid from the car at substantially the same rate at which liquid is supplied, and means in said chamber for monitoring the temperature and flow rate of the liquid discharged.

13. A sterilizing apparatus comprising a package laden mobile car filled with cool water after the packages have been sterilized, said car having a bottom removeable plate covering a discharge opening in the bottom wall of the car, and means operable while the car is stationary for displacing the bottom plate upwardly and cause discharge of the water from the car.

14. A sterilizing apparatus according to claim 13 wherein said discharging means comprises a beam carrying a pad in contact with said bottom plate, and power means for displacing said beam causing said pad to raise said bottom plate.

15. A sterilizing apparatus including a plurality of processing stations for loading, preliminarily pressurizing and heating, sterilizing, depressurizing and cooling, and unloading a mobile car containing a quantity of packages deployed on vertically spaced removeable trays carried by the car, said unloading station comprising means for incrementally raising the trays until the uppermost and successive trays are above the upper edges of the car body, sequentially operable means for successively engaging and moving each tray to a stacking table, means asociated with said engaging and moving means for removing the package from the tray, and means for concurrently lowering said stacking table and raising said tray raising means for transferring another tray.

16. A sterilizing apparatus comprising an inlet lock, a sterilizing chamber and a discharge lock, said inlet lock and said discharge lock defined by hermetically sealable doors sequentially operable to establish a thermal and pressure environment to a package laden mobile car before its introduction to the sterilizing chamber and its introduction to ambient conditions from the discharge lock, means for supplying, sequentially, a fluid under pressure and water at a temperature selected to raise the temperature of the car and its contents to or substantially to the sterilizing temperature the sterilizing temperature to the inlet lock and the car residing therein, and means for supplying fluid under pressure to the discharge lock prior to the presence of a car therein and on reception of a car supplying the car with cooling water.

17. A sterilizing apparatus employing a plurality of cars riding on tracks defining a closed path part of which is defined by an elongate thermal conditioning chamber provided with sequentially moveable partitions dividing that chamber into at least three isolatable chambers serving to thermally condition packages carried by the cars, said apparatus comprising means for moving said partitions to define said at least three isolatable chambrs to respectively preheat, heat and cool the package laden cars, means for supply pressure fluid and a heat treating liquid at a selected temperature to said chambers, said partition moving means being operated so that the preheating chamber does not contain a car while a car in the cooling chamber is being cooled and pressurized.

18. The sterilizing apparatus according to claim 17 wherein said partitions are operated to effect entry of a car in the preheating chamber and discharge of a car from the cooling chamber substantially simultaneously.

19. The sterilizing apparatus according to claim 17 wherein said partitions are operated to maintain constant the pressure in the heating chamber while the temperature of the heat treatment liquid is reduced prior to the introduction of a car in the cooling chamber.

20. In a sterilizing apparatus having at least one car provided with wheels running on parallel tracks and displaced in a rectangular path, the tracks having a space or gap over which the wheels of the car pass over when the direction of car movement changes, said wheels of the car being arranged so that no more than one wheel at a time passes over a gap during its displacement.

21. A sterilizing apparatus comprising a least one mobile car containing packages for sterilization, said car provided with wheels rollingly engaged with parallel tracks and moveable in a closed rectangular path, means along opposite sides of said path for moving the car along said paths, said means comprising an elongate rotatable screw engaging a driving lug carried by said car, said sterilizing apparatus further comprises an inlet lock, a sterilizing chamber and a discharge lock substantially defining one of the opposite sides of said rectangular path, said screw being disposed for rotation in said locks and in said sterilizing chamber and extends outwardly beyond the said locks, said screw portions extending beyond said locks are formed with lead portions of higher pitch to advance the car into the infeed lock and out of the discharge lock at a faster rate than the rate of advance in the sterilizing chamber.

* * * * *